US 6,952,442 B2

(12) United States Patent
Palm

(10) Patent No.: US 6,952,442 B2
(45) Date of Patent: Oct. 4, 2005

(54) ACTIVATION OF MULTIPLE XDSL MODEMS WITH IMPLICIT CHANNEL PROBE

(75) Inventor: Stephen Palm, Tokyo (JP)

(73) Assignee: Panasonic Communications Co., Ltd., Fukuoka (JP)

(*) Notice: Subject to any disclaimer, the term of this patent is extended or adjusted under 35 U.S.C. 154(b) by 0 days.

(21) Appl. No.: 10/657,271

(22) Filed: Sep. 9, 2003

(65) Prior Publication Data

US 2004/0057510 A1 Mar. 25, 2004

Related U.S. Application Data

(63) Continuation of application No. 09/281,813, filed on Mar. 31, 1999.
(60) Provisional application No. 60/094,479, filed on Jul. 29, 1998, provisional application No. 60/093,669, filed on Jul. 22, 1998, provisional application No. 60/089,850, filed on Jun. 19, 1998, and provisional application No. 60/080,310, filed on Apr. 1, 1998.

(51) Int. Cl.[7] ................................................. H04B 1/38
(52) U.S. Cl. ...................................................... 375/222
(58) Field of Search ................................ 375/222, 219; 370/480; 379/93.01, 93.03, 93.07, 93.29

(56) References Cited

U.S. PATENT DOCUMENTS

| 4,679,227 A | 7/1987 | Hughes-Hartogs ............ 379/98 |
| 4,680,773 A | 7/1987 | Amundson ...................... 375/8 |
| 4,897,831 A | 1/1990 | Negi et al. ...................... 370/29 |
| 4,953,210 A | 8/1990 | McGlynn et al. ............. 380/48 |
| 5,144,651 A | 9/1992 | Cooper .......................... 379/98 |
| 5,163,131 A | 11/1992 | Row et al. ................... 395/200 |
| 5,280,586 A | 1/1994 | Kuntz et al. ................ 395/275 |
| 5,311,578 A | 5/1994 | Bremer et al. ................ 379/97 |
| 5,321,722 A | 6/1994 | Ogawa ............................ 375/8 |
| 5,349,635 A | 9/1994 | Scott ............................. 379/97 |

(Continued)

FOREIGN PATENT DOCUMENTS

| CA | 2027230 | 4/1985 | |
| CA | 2111543 | 6/1994 | |
| EP | 0513527 | 11/1992 | ............. H04L/5/14 |
| EP | 0820168 | 1/1998 | ........... H04L/27/00 |
| EP | 0831624 | 3/1998 | ........... H04L/27/00 |

(Continued)

OTHER PUBLICATIONS

ITU–T Recommendation V.8 bis ("Procedures for the Identification and Selection of Common Modes of Operation Between Data Circuit–Terminating Equipments (DCEs) and Between Data Terminal Equipments (DTEs) Over the General Switched Telephone Network and On Leased Point–to–Point Telephone–Type Circuits"), published by the International Telecommunication Union in Aug., 1996.

(Continued)

Primary Examiner—Mohammed Ghayour
Assistant Examiner—Dung X. Nguyen
(74) Attorney, Agent, or Firm—Greenblum & Bernstein, P.L.C.

(57) ABSTRACT

A communication apparatus that is selectively connected to a central communication apparatus. A transmitter associated with the communication apparatus transmits a MR signal to the central communication apparatus. The MR signal requests the central communication apparatus to transmit a MS signal back to the communication apparatus designating a particular communication mode to be used between the communication apparatus and the central communication apparatus. In response to the received MS signal, the transmitter transmits an ACK signal or a NACK signal to the central communication apparatus.

43 Claims, 10 Drawing Sheets

U.S. PATENT DOCUMENTS

| | | | |
|---|---|---|---|
| 5,371,534 A | 12/1994 | Dagdeviren et al. | 348/14 |
| 5,377,188 A | 12/1994 | Seki | 370/85.1 |
| 5,400,322 A | 3/1995 | Hunt et al. | 370/19 |
| 5,410,343 A | 4/1995 | Coddington et al. | 348/7 |
| 5,448,566 A | 9/1995 | Richter et al. | 370/94.01 |
| 5,463,382 A | 10/1995 | Nikas et al. | 340/825.44 |
| 5,463,661 A | 10/1995 | Moran, III et al. | 375/222 |
| 5,479,447 A | 12/1995 | Chow et al. | 375/260 |
| 5,491,720 A | 2/1996 | Davis et al. | 375/222 |
| 5,493,609 A | 2/1996 | Winseck, Jr. et al. | 379/96 |
| 5,608,764 A | 3/1997 | Sugita et al. | 375/344 |
| 5,633,890 A | 5/1997 | Ahmed | 375/219 |
| 5,644,573 A | 7/1997 | Bingham et al. | 370/503 |
| 5,668,857 A | 9/1997 | McHale | 379/93.07 |
| 5,682,419 A | 10/1997 | Grube et al. | 379/60 |
| 5,715,277 A | 2/1998 | Goodson et al. | 375/222 |
| 5,751,914 A | 5/1998 | Coley et al. | 395/51 |
| 5,757,803 A | 5/1998 | Russell et al. | 370/494 |
| 5,781,617 A | 7/1998 | McHale et al. | 379/93.14 |
| 5,796,808 A | 8/1998 | Scott et al. | 379/93.31 |
| 5,805,669 A | 9/1998 | Bingel et al. | 379/28 |
| 5,826,198 A | 10/1998 | Bergins et al. | 455/557 |
| 5,852,655 A | 12/1998 | McHale et al. | 379/93.14 |
| 5,903,608 A | 5/1999 | Chun | 875/260 |
| 5,910,970 A | 6/1999 | Lu | 375/377 |
| 5,912,921 A | 6/1999 | Warren et al. | 375/220 |
| 5,933,454 A | 8/1999 | Cioffi | 375/260 |
| 6,002,722 A | 12/1999 | Wu | 375/295 |
| 6,044,107 A | 3/2000 | Gatherer et al. | 375/222 |
| 6,055,268 A | 4/2000 | Timm et al. | 375/229 |
| 6,064,693 A | 5/2000 | Oliver et al. | 375/222 |
| 6,141,354 A | 10/2000 | Nakatsugawa | 370/465 |
| 6,205,208 B1 | 3/2001 | Detlefsen et al. | 379/93.05 |
| 6,735,245 B1 | 5/2004 | Palm | 375/222 |

FOREIGN PATENT DOCUMENTS

| | | | |
|---|---|---|---|
| EP | 0601260 | 5/1998 | H04M/11/06 |
| EP | 0974202 | 1/2000 | |
| JP | 6-97980 | 4/1994 | |
| JP | 10-752279 | 3/1998 | |
| WO | 97149229 | 12/1997 | |
| WO | 98/10545 | 3/1998 | H04L/5/06 |
| WO | 98110545 | 3/1998 | |
| WO | 99/35756 | 7/1999 | H04B/1/38 |
| WO | 99/49229 | 9/1999 | |

OTHER PUBLICATIONS

An article by K. Krechmer at pp. 63, 64 and 66 of Data Communications, McGraw Hill, NY, vol. 23, no. 2 (Jan. 21, 1994).

English Language Abstract of JP 6–97980.

English Language Abstract of JP 10–75279.

ITU–T Recommendation V.8 bis ("Procedures for the Identification and Selection of Common Modes of Operation Between Data Circuit–Terminating Equipments (DCEs) and Between Data Terminal Equipments (DTEs) Over the General Switched Telephone Network and On Leased Point–to–Point Telephone–Type Circuits"), published by the International Telecommunication Union in Aug., 1996.

An article by F. Mescam, entitled "Introduction A La Procedure De Transmission HDLC", published at pp. 69–73 of L'Onde Electrique, vol. 53, no. 2 (Feb., 1973).

An articled by H. Ohba et al., entitled "End–to–End Protocol Based On CCITT X.25 and Its Implementation", published at pp. 281–287 of Evolutions In Computer Communications, Kyoto Sep. 26–29, 1978, International Conference On Computer Communication, Tokyo, Japan, vol. CONF. Sep. 4, 1978.

An article by K. Krechmer at pp. 63, 64 and 66 of Data Communications, McGraw Hill, NY, vol. 23, no. 2 (Jan. 21, 1994), entitled "V.34 Modems: Off to a Fast Start?".

An article published in the periodical, "Nikkei Communications", vol. 252, Aug. 18, 1997, pp. 80–89.

ITU–T recommendation G.994.1 ("Handshake Procedures For Digital Subscriber Line (DSL) Transceivers"), published by the International Telecommunication Union in Feb., 2001.

| Message type field | — | Revision number field | Vendor Identification | Bit-encoded parameter field |

FIG. 13.

| Non-standard information field (NS) ||||
|---|---|---|---|
| Non-standard information block 1 | Non-standard information block 2 | — | Non-standard information block N |

FIG. 14.

| 8 | 7 | 6 | 5 | 4 | 3 | 2 | 1 |
|---|---|---|---|---|---|---|---|
| Non-standard information length = 2 + L + M + 1 (1 octet) ||||||||
| T.35 country code (2 octets) ||||||||
| Provider code length = L (1 octet) ||||||||
| T.35 provider code (L octets) ||||||||
| Non-standard information (M octets) ||||||||

FIG. 15.

ACTIVATION OF MULTIPLE XDSL MODEMS WITH IMPLICIT CHANNEL PROBE

This is a continuation of U.S. patent application Ser. No. 09/281,813, filed on Mar. 31, 1999, which claims the benefit of U.S. Provisional Application No. 60/080,310 filed on Apr. 1, 1998, U.S. Provisional Application No. 60/089,850 filed on Jun. 19, 1998, U.S. Provisional Application No. 60/093,669 filed on Jul. 22, 1998; and U.S. Provisional Application No. 60/094,479, filed on Jul. 29, 1998.

BACKGROUND OF THE INVENTION

1. Field of the Invention

The present invention is directed to a communications device, such as, for example, a modem, and a method for enabling data communication, and in particular, to an apparatus and method that detects various communication configurations and selects an appropriate communication configuration to establish a communication link.

2. Discussion of Background and Other Information

Traditionally, data communication devices, such as, for example, modems (both analog and digital), have been employed over public switched telephone networks (PSTN) to transmit data between a first location and a second location. Such modems typically operate within a conventional voice band (e.g., approximately 0 through 4 kHz bandwidth) of the PSTN. Early modems transmitted data over the PSTN at a speed of approximately 300 bit/second, or less. Over time, and with the increased popularity of the Internet, faster communication schemes (e.g., modems) were demanded and developed. Currently, the fastest analog modem available (referred to as an ITU-T V.34 modem, as defined by the International Telecommunication Union Telecommunication Standardization Sector (ITU-T)), transmits data at a rate of approximately 33,600 bits/second under ideal conditions. Hybrid digital-analog modems, referred to as ITU-T V.90 modems, can achieve data transmission rates up to 56,000 bits/second under ideal conditions. These modems continue to exchange data within the approximate 4 kHz bandwidth of the PSTN.

It is not uncommon to transfer data files that are several megabytes (MB) in size. A modem that operates utilizing the V.34 modulation requires a long time to transfer such a file. As a result, a need has developed for even faster modems and Internet access methods.

Accordingly, many new communication methods are being proposed and/or developed to transmit high speed or broadband data on the local twisted wire pair that uses the spectrum above the traditional 4 kHz band. For example, various "flavors" (variations) of digital subscriber line (DSL) modems have been/are being developed, such as, but not limited to, for example, DSL, ADSL, VDSL, HDSL, SHDSL and SDSL (the collection of which is generally referred to as xDSL).

Each xDSL variation employs a different communication scheme, resulting in different upstream and/or downstream transfer speeds, and utilizes differing frequency bands of a twisted pair communication channel. A wide range of physical and environmental limitations of the various configurations of the twisted pair wires leads to widely varying expectations of a feasible communication capability bandwidth. Depending on, for example, the quality of the twisted wire pair (e.g., CAT3 wire vs. CAT5 wire), a given xDSL scheme may not be able to transmit data at its maximum advertised data transfer rate.

While xDSL technologies exist and offer the promise of solving the high speed data transfer problem, several obstacles exist to the rapid deployment and activation of xDSL equipment.

Several of the various xDSL schemes permit simultaneous communication on a single twisted pair in the voice band and in a frequency band above the voice band. To achieve a simultaneous voice band and above voice band communication, some xDSL variations require filters, including low pass filters, high pass filters and combinations of filters that are sometimes referred to as "splitters". The filters separate the frequency band that carries voice band communication from the frequency band above the voice band carrying data communication. The use and type of filters may differ between installations.

Recently, there has been technology and market motivation to eliminate or reduce the use of those filters. Thus, for a given communication channel, the presence and/or type of filter is often unknown. There is a need for the communication devices to "know" the existence and configuration of such filters before initiating a communication method, as such filters impacts which communication methods are viable.

Many different xDSL and high speed access technologies solutions have been described in public, proprietary, and/or de facto standards. Equipment at each end of a connection may implement one standard (or several standards) that may (or may not) be mutually compatible. In general, startup and initialization methods of the various standards have been heretofore incompatible.

Line environments surrounding the xDSL data communication schemes, such as, for example, their ability to co-exist with a conventional analog modem that communicates within the conventional voice band (e.g., 0–4 kHz bandwidth), differences in central office equipment, the quality of the line, etc., are numerous, differ significantly, and are complicated. Accordingly, it is essential to be able to determine the capabilities of the communication channel, in addition to being able to determine the capabilities of the communication equipment, in order to establish an optimum and non-interfering communication link.

User applications can have a wide range of data bandwidth requirements. Although a user could always use the highest capacity xDSL standard contained in a multiple xDSL box, in general, that will be the most expensive service, since communication costs are generally related to the available bandwidth. When a low bandwidth application is used, the user may desire the ability to indicate a preference for a low bandwidth xDSL (and hence, a cheaper communication service), as opposed to using a high bandwidth xDSL service. As a result, it is desirable to have a system that automatically indicates user service and application requirements to the other end of the link (e.g., central office).

In addition to the physical composition of the communication equipment and communication channel, high speed data access complexity is also influenced by regulatory issues. The result has been that possible configuration combinations at each end of a communication channel have grown exponentially.

The US Telecommunication Act of 1996 has opened the vast infrastructure of metallic twisted wire pairs to both competitive (CLEC) usage, and the incumbent telephone provider (ILEC) that originally installed the wires. Thus, multiple providers may have differing responsibilities and equipment deployed for a single wire pair.

In a given central office termination, a given communication channel (line) may be solely provisioned for voiceband-only, ISDN, or one of the many new xDSL (ADSL, VDSL, HDSL, SDSL, etc.) services. Since the Carterphone court decision, telephone service users (customers) have a wide range of freedom for placing (i.e., installing and utilizing) communication customer premise equipment (e.g., telephones, answering machines, modems, etc.) on voiceband channels. However, customer premise equipment (CPE) associated with leased data circuits has typically been furnished by the service provider. As the high speed communication market continues to evolve, customers will also expect and demand freedom in selecting and providing their own CPE for high speed circuits using the band above the traditional voice band. This will place increased pressure on the service providers to be prepared for a wide range of equipment to be unexpectedly connected to a given line.

The customer premise wiring condition/configuration inside of the customer premise (e.g. home, office, etc.) and the range of devices already attached to nodes in the wiring are varied and unspecifiable. For a service provider to dispatch a technician and/or craftsman to analyze the premise wiring and/or make an installation represents a large cost. Accordingly, an efficient and inexpensive (i.e., non-human intervention) method is needed to provide for the initialization of circuits in the situation where a plethora of communication methods and configuration methods exist.

Still further, switching equipment may exist between the communication channel termination and the actual communication device. That switching equipment may function to direct a given line to a given type of communication device.

Thus, a high speed data access start-up technique (apparatus and method) that solves the various equipment, communication channel, and regulatory environment problems is urgently needed.

In the past, the ITU-T has published recommended methods for initiating data communication over voice band channels. Specifically, two Recommendations were produced:

1) Recommendation V.8 (09/94)—"Procedures for Starting Sessions of Data Transmission over the General Switched Telephone Network"; and 2) Recommendation V.8bis (08/96)—"Procedures for the Identification and Selection of Common Modes of Operation Between Data Circuit-terminating Equipments (DCEs) and Between Data Terminal Equipments (DTEs) over the General Switched Telephone Network".

Both Recommendations use a sequence of bits transmitted from each modem to identify and negotiate mutually common (shared) operating modes, such as the modulation scheme employed, protocol, etc. However, both startup sequence Recommendations are applicable only to the conventional voice band communication methods. Further, these conventional startup sequences do not test (and/or indicate) the constitution and/or condition of the communication channel between the modems.

However, line condition information, such as, for example, frequency characteristics, noise characteristics, presence or absence of a splitter, etc., is useful at the time that plural xDSL modems are negotiating a connection, prior to actually connecting to each other, if the communications link is to be successfully established.

Voice band line probing techniques are known in the art and can be used to determine voice band line condition information. Such techniques have been used to optimize a given modulation method, such as, for example, V.34, but have not been used to optimize startup methods and/or communication selection methods. In a set of devices with multiple modulation methods, V.8 or V.8bis has been used to negotiate and then select a particular modulation. After the modulation initiation sequence has started, line probing techniques are used to receive some indication of the condition of the communication channel. If it is determined at that point that a given communication channel can not effectively support a chosen modulation method, time consuming heuristic (i.e., self-learning) fallback techniques are employed by the prior art to try and find a modulation method that works.

In order to establish an improved communication link, a method is required that observes (examines) the line conditions before attempting to select the most appropriate communication method. While techniques have been established to increase the data rate for a given modulation, the prior art does not provide a method for using channel information to aid in the selection of the communication method.

Unfortunately, in the current state of the art, capability negotiations occur without knowledge of the prevailing channel configuration. Explicit knowledge of spectrum, splitting, etc. is vital to the selection of the most appropriate communication mechanism (modulation) decision process.

Definitions

During the following discussion, the following definitions are employed:

activating station (calling station)—the DTE, DCE and other associated terminal equipment which originates an activation of an xDSL service;

answering station—the DTE, DCE and other associated terminal equipment which answers a call placed on a GSTN;

carrier set—a set of one or more frequencies associated with a PSD mask of a particular xDSL Recommendation;

CAT3—cabling and cabling componenets designed and tested to transmit cleanly to 16 MHZ of communications. Used for voice and data/LAN traffic to 10 megabits per second;

CAT5—cabling and cabling componenets designed and tested to transmit cleanly to 100 MHZ of communications;

communication method—form of communication sometimes referred to as modems, modulations, line codes, etc.;

downstream—direction of transmission from the xTU-C to the xTU-R;

errored frame—frame that contains a frame check sequence (FCS) error;

Galf—an octet having the value $81_{16}$; i.e., the ones complement of an HDLC flag;

initiating signal—signal which initiates a startup procedure;

initiating station—DTE, DCE and other associated terminal equipment which initiates a startup procedure;

invalid frame—frame that has fewer than four octets between flags, excluding transparency octets;

message—framed information conveyed via modulated transmission;

metallic local loop—communication channel 5, the metallic wires that form the local loop to the customer premise;

responding signal—signal sent in response to an initiating signal;

responding station—station that responds to initiation of a communication transaction from the remote station;

session—active communications connection, measured from beginning to end, between computers or applications over a network;

signal—information conveyed via tone based transmission;

signaling family—group of carrier sets which are integral multiples of a given carrier spacing frequency;

splitter—combination of a high pass filter and a low pass filter designed to split a metallic local loop into two bands of operation;

telephony mode—operational mode in which voice or other audio (rather than modulated information-bearing messages) is selected as the method of communication;

transaction—sequence of messages, ending with either a positive acknowledgment [ACK(1)], a negative acknowledgment (NAK), or a time-out;

terminal—station; and upstream: The direction of transmission from the xTU-R to the xTU-C.

Abbreviations

The following abbreviations are used throughout the detailed discussion:

ACK—Acknowledge Message;
ADSL—Asymmetric Digital Subscriber Line;
ANS—V.25 answer tone;
ANSam—V.8 modulated answer tone;
AOM—Administration, Operations, and Management;
CCITT—International Telegraph and Telephone Consultative Committee;
CDSL—Consumer Digital Subscriber Line;
CR—Capabilities Request;
CL—Capabilities List;
CLR—Capabilities List Request;
DCME—Digital Circuit Multiplexing Equipment;
DPSK—Differential encoded binary Phase Shift Keying;
DIS—Digital Identification Signal;
DMT—Discrete Multi-Tone;
DSL—Digital Subscriber Line;
EC—Echo canceling;
EOC—Embedded Operations channel;
ES—Escape Signal;
FCS—Frame Check Sequence;
FDM—Frequency Division Multiplexing;
FSK—Frequency Shift Keying;
GSTN—General Switched Telephone Network (same as PSTN);
HDSL—High level Data Link Control;
HSTU—Handshake Transceiver Unit;
IETF—Internet Engineering Task Force;
ISO—International Organization for Standardization;
ITU-T—International Telecommunication Union-Telecommunication Stndardization Sector;
LSB—Least Significant Bit;
LTU—Line Termination Unit (Central office end);
MR—Mode Request;
MS—Mode Select;
MSB—Most Significant Bit;
NAK—Negative Acknowledge Message;
NTU—Network Termination Unit (Customer premise end);
OGM—Outgoing Message (recorded voice or other audio);
ONU—optical network Unit;
POTS—Plain Old Telephone Service
PSD—Power Spectral Density;
PSTN—Public Switched Telephone Network;
RADSL—Rate Adaptive DSL;
REQ—Request Message Type Message;
RFC—Request For Comment;
RTU—RADSL Terminal Unit;
SAVD—Simultaneous or Alternating Voice and Data;
SNR—Signal to Noise Ratio;
VDSL—very high speed Digital Subscriber Line;
xDSL—any of the various types of Digital Subscriber Lines (DSL);
xTU-C—central terminal unit of an xDSL; and
xTU-R—remote terminal unit of an xDSL.

SUMMARY OF THE INVENTION

Based on the foregoing, the present invention is directed to a communication method, modem device and data communication system that detects various configurations, capabilities and limitations of a communication channel, associated equipment, and regulatory environment in order to determine a specific (xDSL) communication standard appropriate for the existing line conditions. To accomplish this goal, the invention employs several individual techniques as a system.

According to one aspect of the present invention, a method and apparatus are provided to negotiate between modems that embody multiple (plural) communication methods (e.g., DSL standards), so as to select a single common communication standard to be used for a communication session. A communication control section executes a handshake procedure (protocol) in a negotiation channel to obtain information concerning high speed data communication, including type identification information of the xDSL used in the communication exchange. A communication standard refers to any type of standard, whether defacto, proprietary, or issued by an industry or governmental body.

According to another aspect of the instant invention, characteristics of the communication channel between a central communication system and a remote communication system are determined using an examination signal. The examination signal detects impairments, such as, but not limited to, for example, frequency roll-off and noise, that are identified and detected between the central system and the remote systems. Information pertaining to the quality of the communication channel enables the present invention to make an informed decision concerning the selection of a communication standard. (e.g., whether to use CDSL instead of ADSL, or use CDSL instead of VDSL).

The combination of all of the various aspects of the invention provides a method and apparatus for effectively and efficiently performing an audit of the communication channel and installed equipment to select the most appropriate communication method. System designers, installers, and providers are able to predetermine and set various parameters that are considered by the method and apparatus of the present invention during the negotiation process to effectively define the meaning of "most appropriate means of communication".

According to the present invention, a procedure to determine a possible high speed communication, and selection of supported capabilities for a high speed data communication, and the examination of the communication line characteristics may be concurrently (simultaneously) executed, thus enabling the immediate shifting to a handshake protocol corresponding to the determined data communication procedure. In this regard, it is understood that the procedure may also be sequentially executed.

The invention may be included in both sides of the communication channel for optimum negotiation. However, according to an advantage of the present invention, the invention can be incorporated into (contained in) just one side of the communication channel. Such configurations will be accurately reported to the communication systems, and, if appropriate, the communication systems can fall back to legacy (e.g., analog) communication methods, if the communication system provides such support.

The instant invention does not need to be embodied in the actual high speed communication devices, but may be implemented in intelligent switches that terminate and/or segment the communication channel. This allows a communication system to use various communication standards implemented in separate devices (or modems) that can be correctly assigned (on a "as needed" basis) through explicit negotiation of the capabilities and requirements of the central system and the remote communication system.

According to an advantage of the present invention, an environmentally friendly method for selecting start-up carriers is provided.

According to another feature of the present invention, ITU-T G.997.1 may be used to configure the information field registers.

According to another advantage of the instant invention, a unique data format, coding format and data structures for messages is provided.

According to an object of the instant invention, an apparatus for establishing a communication link, comprises a negotiation data transmitting section, associated with a plurality of initiating communication devices, that transmits carriers to a responding communication device, a negotiation data receiving section, associated with the plurality of initiating communication devices, that receives carriers from the responding communication device, in response to the transmitted carriers, and a selecting device that selects an appropriate communication device from the plurality of communication devices, in accordance with the responding communication device, so as to establish a communication channel.

According to a feature of the invention, the transmitted carriers contain data related to a useable carrier allocation. In addition, the transmitted carriers and the received carriers may be divided into a plurality of bands. A system selects a plurality of bands to minimize interference with a voice band device.

An advantage of the instant invention is that the negotiation data transmitting section transmits the carriers in accordance with neighboring receiving systems. The transmission characteristics of the transmitted carriers are re-configurable during a transmission operation in order to minimize interference with the neighboring receiving stations.

According to an object of the instant invention, a method is disclosed for establishing a communication link. The method transmits predetermined carriers to a responding communication device, receives predetermined carriers from the responding communication device, in response to the predetermined transmitted carriers, and selects an appropriate communication device from a plurality of communication devices, in accordance with the received predetermined carriers, to establish a communication channel.

A feature of this object of the invention includes the dividing of the transmitted carriers and the received carriers into a plurality of bands.

Another feature of this invention is that the transmitting of predetermined carriers comprises transmitting the carriers in accordance with neighboring receiving systems. The transmitting of transmission characteristics of the carriers comprises re-configuring the carriers during a transmission operation in order to minimize interference with the neighboring receiving stations.

Another object of the instant invention is to provide a communication device that at least one of transmits and receives a communication signal, comprising a data exchanging device that exchanges data, between an initiating communicating device and a responding communication device, over a communication channel, and an implicit channel probe device that analyzes the exchanged data to assess characteristics of the communication channel.

The data exchanging device of this invention comprises a transmitter that transmits results of the analyzed exchanged data as part of the exchanged data.

The implicit channel probe device comprises an analyzer that monitors the communication channel by performing a spectral analysis of the exchanged data. The exchange of data and the analysis of exchanged data may occur at substantially the same time, or sequentially in time.

According to a feature of the invention, the exchanged data comprises a plurality of initializing carriers, the plurality of initializing carriers being exchanged between the initiating communicating device and the responding communication device.

According to another object of the instant invention, method for at least one of transmitting and receiving a communication signal is disclosed, comprising the exchange of data between an initiating communicating device and a responding communication device, over a communication channel, and the performing of an implicit channel probe analysis on the exchanged data to assess characteristics of the communication channel.

An advantage of this invention is that the exchange of data comprises transmitting results of the analyzed exchanged data as part of the exchanged data.

Another advantage of the present invention is that the performing of an implicit channel probe analysis comprises performing a spectral analysis of the exchanged data.

According to a feature of the invention, the method further comprises exchanging the data and performing the analysis at substantially the same time, or, alternatively, sequentially in time.

A feature of the current invention resides in the exchanging of a plurality of initializing carriers between the initiating communicating device and the responding communication device.

Another object of the instant invention pertains to a communication device, comprising a communication device that initially transmits data with a multiplicity of carriers, and a carrier determining device that reduces the multiplicity of carriers transmitted by said communication device to a predetermined number of carriers, in accordance with a predetermined carrier reduction system.

According to a feature of the instant invention, the predetermined carrier reduction system comprises a pair phase reversal system, a modulate carrier system, or a carrier use and request transmit system.

According to another feature of the invention, the carrier determining device comprises a reduction device that reduces the multiplicity of carriers to the predetermined number of carriers in order to limit a transmit power during an initialization procedure.

a still further feature of the instant invention pertains to the carrier determining device, which comprises a determining device that determines the most usable communications channels.

According to this invention, the initial transmission of the multiplicity of carriers comprises a system that increases a likelihood of establishing a communication channel. The carrier determining device reduces the multiplicity of carriers to the predetermined number of carriers to reduce a power transmission requirement.

According to another object of the current invention, a method for establishing a communication link is disclosed, comprising the exchange of unmodulated carriers between an initiating communication device and a responding communication device, to negotiate a high speed communication link, and the execution of a fallback procedure to establish a predetermined communication link if one of the initiating communication device and the responding device is unable to process the unmodulated carriers for negotiating the high speed communication link.

The execution of a fallback procedure comprises executing a predetermined escape procedure to establish a communication link with a legacy high speed communication device, or, alternatively, executing a predetermined explicit connection procedure to establish a communication link with the legacy high speed communication device.

According to a feature of the invention, the execution of the fallback procedure comprises executing a voiceband modulation procedure to establish a voiceband communication link.

a still further object of the present invention pertains to a method for establishing a communication link between a first device and a second device, comprising transmitting a first capabilities list to one of the first device and the second device, receiving a second capabilities list transmitted by a remaining one of the first device and the second device, in response to the first capabilities list, selecting an appropriate communication mode from a plurality of communication modes, in accordance with the second capabilities list, to establish the communication channel, and executing a simplified initialization procedure to re-establish the communication link in the event that one of the first device and the second device has entered a non-data exchange state and data is to be exchanged between the first device and second device.

Another object of the instant invention pertains to a method for establishing a communication link between a first device and a second device, comprising establishing common communication capabilities between the first device and the second device, selecting an appropriate communication mode from a plurality of communication modes, in accordance with the established common communication capabilities, and executing a simplified initialization procedure to re-establish the communication link in the event that one of the first device and the second device has entered a non-data exchange state and data is to be exchanged between the first device and second device.

Another object of the invention pertains to a method for establishing a communication link, comprising executing a negotiation protocol in order to establish a communication link between a first communication device and a second communication device, maintaining a carrier of the negotiation protocol upon establishing the communication link, to serve as an embedded operations channel.

According to a feature of the invention, the embedded operations channel transmits managerial data.

In another object of the instant invention, a communication device is disclosed, comprising means for performing a handshake communication procedure, and means for configuring handshake communication parameters from a terminal using a Simple Network Management Protocol. Further, the communication device may also include means for monitoring the handshake communication parameters from the terminal. In addition, the invention may use an Administration, Operations, and Management (AOM) Simple Network Management Protocol (SNMP) to configure and monitor a handshake procedure for establishing a high speed communication link The present disclosure relates to subject matter contained in U.S. Provisional Application Nos. 60/080,310 filed on Apr. 1, 1998; 60/089,850 filed on Jun. 19, 1998; 60/093,669 filed on Jul. 22, 1998; and 60/094,479, filed on Jul. 29, 1998, the disclosures of which are expressly incorporated herein by reference in their entirety.

The present disclosure also refers to the following Recommendations, the subject matter of which is expressly incorporated herein by reference in their entirety:

Recommendation V.8bis (09/94)—"Procedures for Starting Sessions of Data Transmission over the General Switched Telephone Network", published by Telecommunication Standardization Sector of the ITU;

Recommendation V.8 (08/96)—"Procedures for the Identification and Selection of Common Modes of Operation Between Data Circuit-terminating Equipments (DCEs) and Between Data Terminal Equipments (DTEs) over the General Switched Telephone Network", published by Telecommunication Standardization Sector of the ITU;

Recommendation T.35—"Procedures for the Allocation of CCITT Defined Codes for Non-standard Facilities", published by Telecommunication Standardization Sector of the ITU; and Recommendation V.34 (10/96)—"a Modem Operating at Data Signaling Rates of up To 33,600 bit/s for Use on the General Switched Telephone Network and on Leased Point-to-point 2-wire Telephone-type Circuits", published by Telecommunication Standardization Sector of the ITU.

BRIEF DESCRIPTION OF THE DRAWINGS

The foregoing and other objects, features and advantages of the invention will be apparent from the following more particular description of preferred embodiments, as illustrated in the accompanying drawings, which are presented as a non-limiting example, in which reference characters refer to the same parts throughout the various views, and wherein:

FIG. 13 shows the structure of octets in the Identification (I) field;

FIG. 14 shows the structure of Non-Standard information blocks in a Non-Standard information (NS) field; and FIG. 15 shows the octet structure of data in each Non-Standard information block.

DETAILED DESCRIPTION OF PREFERRED EMBODIMENTS

Figure 1:
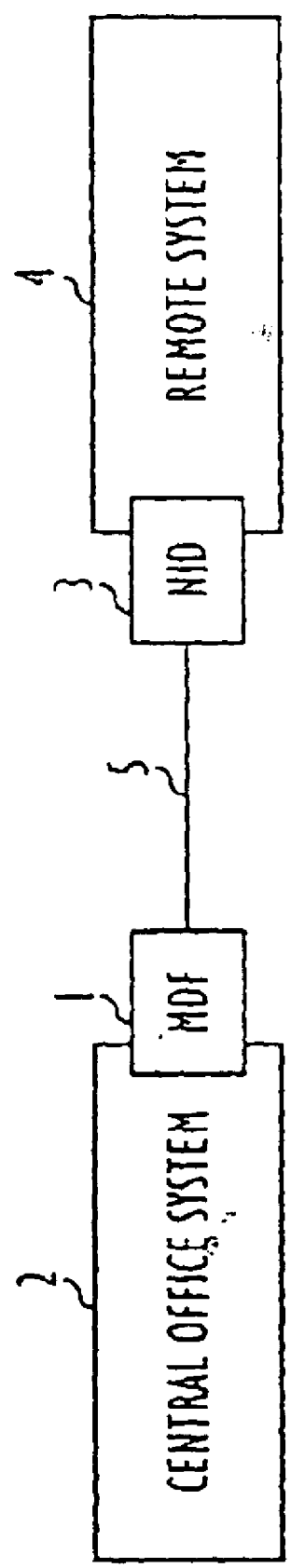
FIG. 1 is a schematic block diagram of a general environment for usage of the present invention.

According to a first embodiment of the present invention, a data communication system comprises a central office system 2 and a remote system 4, which are interfaced together via a communication channel 5, as shown in FIG. 1.

The central office system 2 includes a main distribution frame (MDF) 1 that functions to interface the central office system 2 to the communication channel 5. The main distribution frame (MDF) 1 operates to connect, for example, telephone lines (e.g., communication channel 5) coming from the outside, on one side, and internal lines (e.g., internal central office lines) on the other side.

The remote system 4 includes a network interface device (NID) 3 that functions to interface the remote system 4 to the communication channel 5. The network interface device (NID) 3 interfaces the customer's equipment to the communications network (e.g., communication channel 5).

It is understood that the present invention may be applied to other communications devices without departing from the spirit and/or scope of the invention. Further, while the present invention is described with reference to a telephone communication system employing twisted pair wires, it is understood that the invention is applicable to other transmission environments, such as, but not limited to, cable communication systems (e.g., cable modems), optical communication systems, wireless systems, infrared communication systems, etc., without departing from the spirit and/or scope of the invention.

Figure 3:
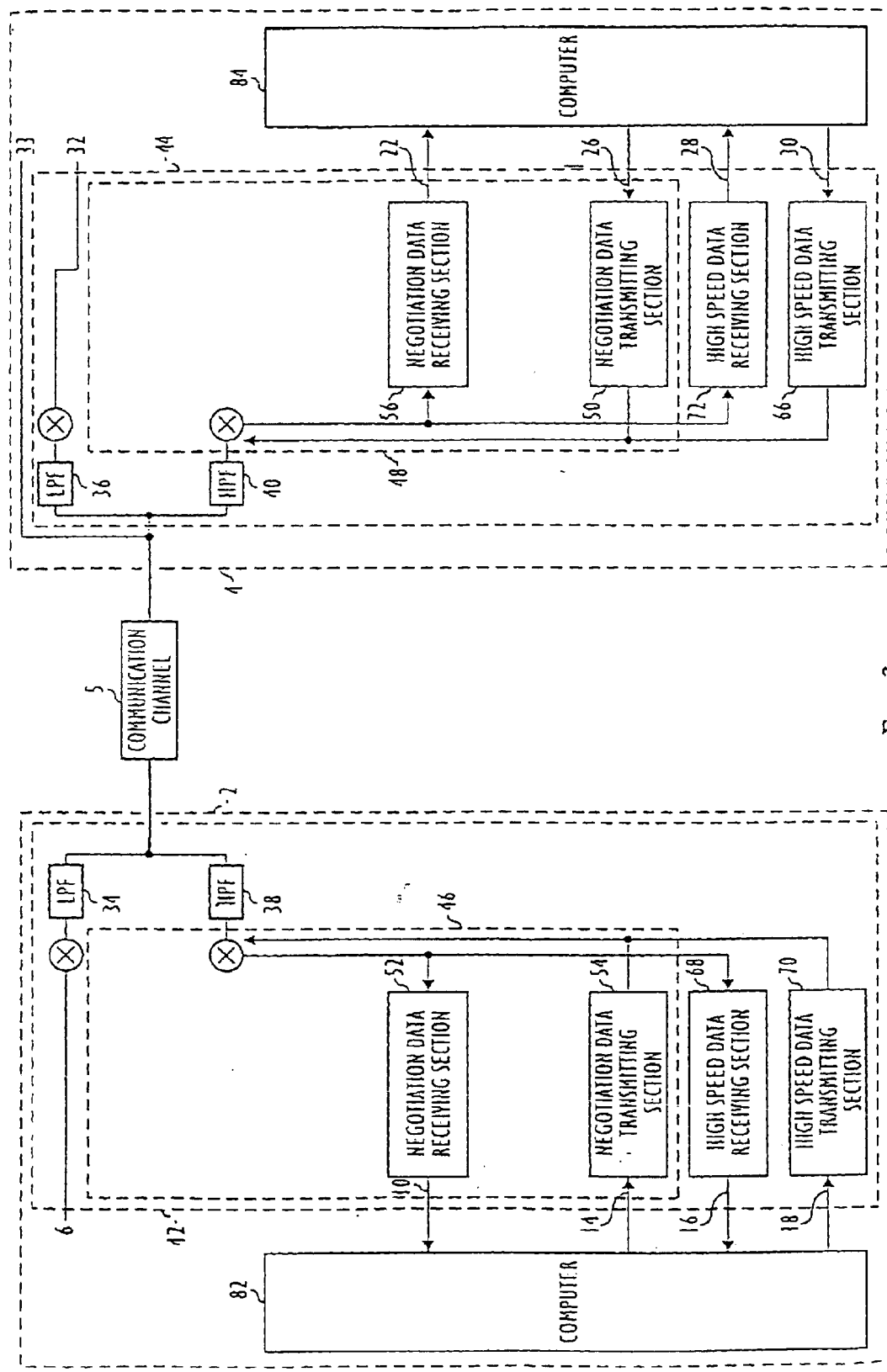
FIG. 3 is a schematic block diagrams of a preferred embodiment of the present invention used in connection with two exemplary high speed (xDSL) modems adapted to transmit signals to each other over a communication channel.

FIG. 3 illustrates a detailed block diagram of the first embodiment of the data communication system of FIG. 1. This embodiment represents a typical installation, in which both the central office system 2 and the remote system 4 implement the instant invention.

As shown in FIG. 3, the central office system 2 comprises a low pass filter 34 and a high pass filter 38, a test negotiation block 46, a high speed data receiving section 68, a high speed data transmitting section 70, and a computer 82. Computer 82 is understood to be a generic interface to network equipment located at the central office. Test negotiation block 46 performs all of the negotiation and examination procedures which takes place prior to the initiation of an actual high speed data communication.

The low pass filter 34 and high pass filter 38 function to filter communication signals transferred over the communication channel 5. The test negotiation block 46 tests and negotiates conditions, capacities, etc. of the central office system 2, the remote system 4, and the communication channel 5. The procedures of the test negotiation block 46 are completed prior to, and initiate the selection of the high speed modem receiving and transmitting sections (e.g., modems) 68 and 70. The high speed receiving section 68 functions to receive high speed data transmitted from the remote system 4, while the high speed data transmitting section 70 transmits high speed data to the remote system 4. The high speed sections 68 and 70 may comprise, but not be limited to, for example, ADSL, HDSL, SHDSL, VDSL, CDSL modems. High speed sections 68 and 70 can be a plurality of high speed transmission devices which "share" the common block 46 during the initial negotiation procedure. The negotiation data receiving section 52 and the high speed data receiving section 68 transmit signals to computer 82. The negotiation data transmitting section 54 and the high speed data transmitting section 70 receive signals issued from the computer 82.

In the disclosed embodiment, test negotiation block 46 comprises a negotiation data receiving section 52 and a negotiation data transmitting section 54. The negotiation data receiving section 52 receives negotiation data, while the negotiation data transmitting section 54 transmits negotiation data. The operation of the various sections of the central office system 2 will be described, in detail, below.

Remote system 4 comprises a low pass filter 36, a high pass filter 40, a test negotiation block 48, a high speed data receiving section 72, a high speed data transmitting section 66, and a computer 84. Computer 84 is understood to be a generic interface to network equipment located at the remote system. Test negotiation block 48 performs all of the negotiation and examination procedures that take place prior to the actual high speed data communication.

The low pass filter 36 and high pass filter 40 operate to filter communication signals transferred over the communication channel 5. The test negotiation block 48 tests and negotiates conditions, capacities, etc. of the central office system 2, the remote system 4, and the communication channel 5. The high speed receiving section 72 functions to receive high speed data transmitted from the central office system 2, while the high speed data transmitting section 66 transmits high speed data to the central office system 2. The negotiation data receiving section 56 and the high speed data receiving section 72 transmit signals to the computer 84. The negotiation data transmitting section 50 and the high speed data transmitting section 66 receive signals issued from the computer 84.

In the disclosed embodiment, the test negotiation block 48 comprises a negotiation data receiving section 56 and a negotiation data transmitting section 50. The negotiation data receiving section 56 receives negotiation data, while the negotiation data transmitting section 50 transmits negotiation data. The operation of the various sections of the remote system 4 will be described, in detail, below.

The negotiation data transmitting section 50 of the remote system 4 transmits the upstream negotiation data to the negotiation data receiving section 52 of the central system 2. The negotiating data transmitting section 54 of the central system 2 transmits the downstream negotiating data to the negotiation data receiving section 56 of the remote system 4.

The central office system 2 includes a plurality of channels 6, 10, 14, 16 and 18 that are used to communicate with a plurality of channels 22, 26, 28, 30 and 32 of the remote system 4. In this regard, it is noted that in the disclosed embodiment, channel 6 comprises a central voice channel that is used to directly communicate with a corresponding remote voice channel 32 in a conventional voice band (e.g., 0 Hz to approximately 4 kHz), which has been filtered by low pass filters 34 and 36. Further, a remote voice channel 33 is provided in the remote system 4 that is not under the control of the central office system 2. Remote voice channel 33 is connected in parallel with the communication channel 5 (but prior to the low pass filter 36), and thus, provides the same service as the remote voice channel 32. However, since this channel is connected prior to the low pass filter 36, the remote voice channel 33 contains both the high speed data signal and a voice signal.

It is noted that the filters may be arranged to have different frequency characteristics, so that a communication may take place using other, low band communication methods, such as, for example, ISDN, between voice channels 6 and 32. The high pass filters 38 and 40 are selected to ensure a frequency spectrum above 4 kHz.

Bit streams 10, 14, 16 and 18 (in the central office system 2) and bit streams 22, 26, 28 and 30 (in the remote system 4) comprise digital bit streams that are used to communicate between the central computer 82 and the remote computer 84, respectively. It is understood that it is within the scope of the present invention that bit streams 10, 14, 16, and 18 could be implemented as discrete signals (as shown), or bundled into an interface, or cable, or multiplexed into a single stream, without changing the scope and/or function of the instant invention. For example, bit streams 10, 14, 16 and 18 may be configured as (but are not limited to) an interface conforming to a RS-232, parallel, FireWire (IEEE-1394), Universal Serial Bus (USB), wireless, or infrared (IrDA) standard. Likewise, it is understood that bit streams 22, 26, 28 and 30 can be implemented as discrete signals (as shown in the drawings), or bundled into an interface, or cable, or multiplexed into a single stream, as described above.

Negotiation data (e.g., control information) corresponding to the condition of the communication line (e.g., frequency characteristics, noise characteristics, presence or absence of a splitter, etc.) is exchanged between the negotiation data receiving section 52 and negotiation data transmitting section 54 of the central office system 2, and the negotiation data receiving section 56 and negotiation data transmitting section 50 of the remote system 4.

The essential features of the hardware portion of the invention is the functionality contained in the test negotiation blocks 46 and 48, which test and negotiate the conditions, capabilities, etc. of the central office system 2, the remote system 4, and the communication channel 5. In practice, the configuration of the central office system 2 and the remote system 4 is subject to wide variations. For example, the configuration of the external voice channel 33 is not under the control of the same entities that control the central office system 2. Likewise, the capabilities and configuration of the communication channel 5 are also subject to wide variation. In the disclosed embodiment, test negotiation blocks 46 and 48 are embedded within modems 42 and 44. However, the functionality of test negotiation blocks 46 and 48 may, alternatively, be implemented separate and distinct from the modems 42 and 44. Signals transmitted and received between the test negotiation blocks 46 and 48 are used for testing the environment itself as well as communicating the results of the tests between the central office system 2 and the remote system 4.

The purpose of each signal path in FIG. 3 will be explained followed by an explanation of the devices used to create the signals. Examples of specific values for the various frequencies will be discussed in detail, below.

In the disclosed embodiment, frequency division multiplexing (FDM) is utilized for various communication paths to exchange information between the central office system 2 and the remote system 4. However, it is understood that other techniques (such as, but not limited to, for example, CDMA, TDMA, etc.) may be used without departing from the spirit and/or scope of the present invention.

The range from frequency 0 Hz until frequency 4 kHz is typically referred to as the PSTN voice band. Newer communication methods attempt to use the frequency spectrum above 4 kHz for data communication. Typically, the first frequency where transmission power is allowed occurs at approximately 25 kHz. However, any frequency above 4 kHz may be used. In this regard, it is noted that tone bursts at a frequency of 34.5 kHz are used to initiate T1E1 T1.413 ADSL modems. As a result, if possible, that frequency should be avoided in the spectrum used by precursor negotiation methods.

The communication paths are defined in pairs, one-path for an upstream communication from the remote system 4 to the central office system 2, and another path for a downstream communication from the central office system 2 to the remote system 4. The negotiation upstream bits are transmitted by the negotiation data transmitting section 50 of the remote system 4, and received by the negotiation data receiving section 52 of the central office system 2. The negotiation downstream bits are transmitted by the negotiation data transmitting section 54 of the central office system 2, and received by the negotiation data receiving section 56 of the remote system 4. Once the negotiation and high speed training has been completed, the central office system 2 and the remote system 4 use high speed data transmitting sections 66 and 70, and high speed data receiving sections 72 and 68 to perform a duplex communication.

All messages in the present invention are sent with one or more carriers using, for example, a Differential (Binary) Phase Shift Keying (DPSK) modulation. The transmit point is rotated 180 degrees from the previous point if the transmit bit is a 1, and the transmit point is rotated 0 degrees from the previous point if the transmit bit is a 0. Each message is preceded by a point at an arbitrary carrier phase. The frequencies of the carriers, and the procedures for starting the modulation of carriers and messages, will be described below.

Once the remote system 4 begins receiving valid user downstream data, all of the various communication channels have been established and are ready for the negotiation procedures to be described below.

After the remote system 4 has received the spectrum information, it analyzes the equipment capabilities, the application desires, and the channel limitations to make a final decision on the communication method to use.

After the central office system 2 has received the final decision, the transmission of the negotiation downstream data is stopped. When the remote system 4 detects the loss of energy (carrier) from the central office system 2, the remote system 4 stops transmitting the negotiation upstream data. After a short delay, the negotiated communication method begins it's initialization procedures.

Figure 2:
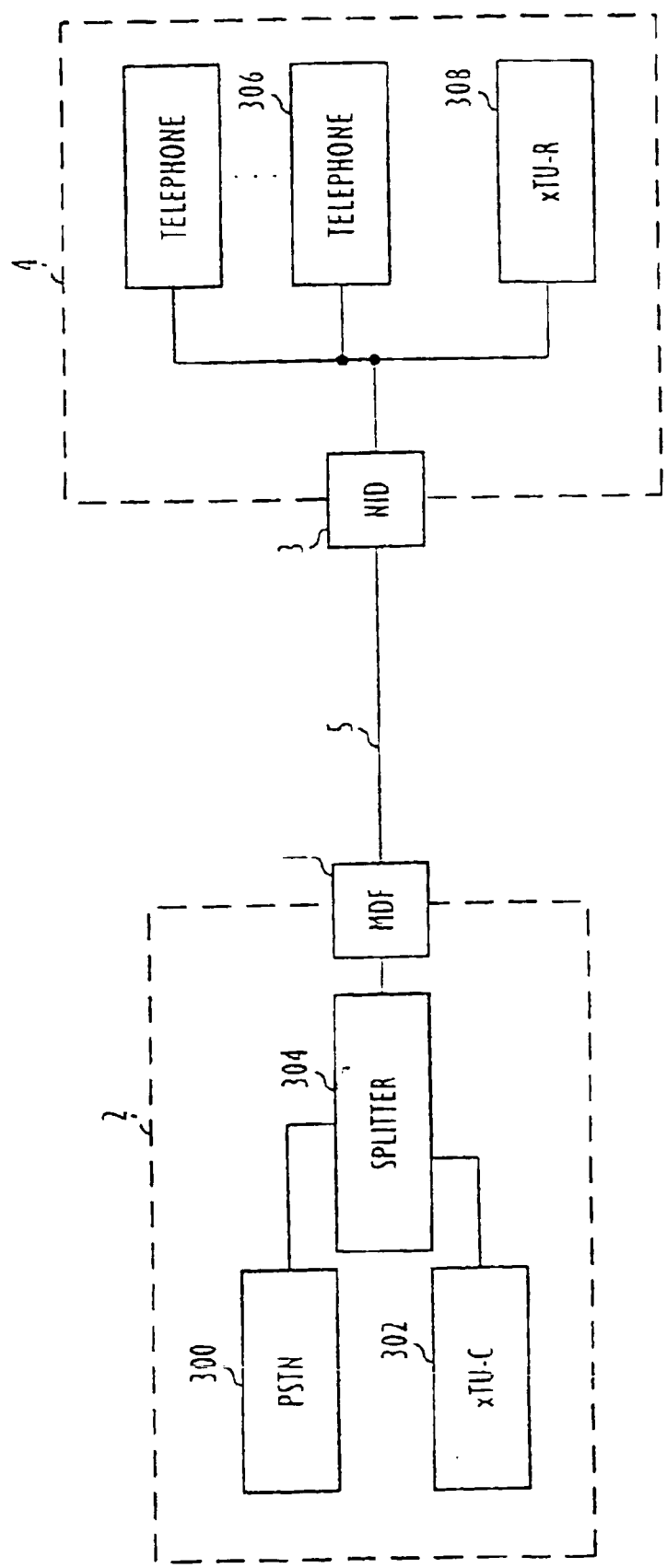
FIG. 2 is a schematic block diagram of the present invention under an exemplary situation in which Central Office equipment has been provisioned for xDSL service and Remote equipment does not employ a splitter.

In the exemplary system of FIG. 2, the voice channel 6 is often connected to a PSTN switch 300, and the functionality of the xTU-C 302 is embodied in modem 42. Central office splitter 304 comprises a low pass filter 34 and high pass filter 38. In the remote system 4, multiple telephones 306 are connected to voice channel 32 or 33, and the xTU-R 308 is implemented in modem 44.

The present invention goes to great lengths, both before the handshake procedure is performed and during the handshake procedure, to be spectrally polite or as non-obtrusive as possible.

In this regard, the instant invention uses a unique method (criteria) for selecting the transmission and reception carriers (frequency bands), as embodied in a PSD. The spectrum and carrier allocation for the preferred embodiment of the present invention will now be described. The description begins with a review of the upstream and downstream PSD requirements of several different xDSL services that are co-mingled with POTS or ISDN services. Implications of the xDSL PSDs on the present invention PSD are also discussed.

Downstream carriers are transmitted by the negotiation data transmitting section 54 of the central office system 2, and upstream carriers are transmitted by the negotiation data transmitting section 50 of the remote system 4.

The present invention is used to initiate or activate many types of existing and future xDSL services. The requirements of the various xDSL services have been taken into consideration in the design of present invention. This description addresses two inter-related considerations: spectrum and activation methods. In the present invention, suitable bands were selected for the transmission of the negotiation data channels. The bands were selected based upon several criteria, including considering the existing overall PSDs of the xDSL services and also the activation signals of existing xDSL services.

Examples of various spectra of typical xDSL and existing services that might be negotiated by the present invention are shown in Table 1. For purposes of definition, "upstream" and "downstream" directions using the nomenclature from the various xDSL services are indicated in Table 2. Table 3 lists the initiating activating sequences of several xDSL. Together these tables outline the typical environment in which the present invention must be capable of operating.

TABLE 1 survey of existing relevant spectra

| Modulation (Document) | Total Bandwidth | | Upstream Bandwidth | | Down Stream Bandwidth | |
|---|---|---|---|---|---|---|
| | Lower (kHz) | Upper (kHz) | Lower (kHz) | Upper (kHz) | Lower (kHz) | Upper (kHz) |
| ITU-T G.992.1 Annex a | 26 | 1,104 | 26 | 138 | 26 | 1,104 |
| ITU-T G.992.2 Annex a (FDM) | 26 | 1,104 | 26 | 138 | 26 | 1,104 |
| ITU-T G.992.1 Annex B | 138 | 1,104 | | | | |
| ITU-T G.992.1 Annex C | 26 | 50 | 26 | 50 | 26 | 50 |
| ITU-T G.992.2 Annex C | 26 | 50 | 26 | 50 | 26 | 50 |
| T1E1 HDSL2 or ITU-T G.shdsl | | | 0 | 400 | 0 | 900 |
| VDSL (with European ISDN) DTS/TM-06003-1 (draft) V0.0.7 (1998-2) Section 8.2 Frequency plan | 300 | 30,000 | 300 | 30,000 | 300 | 30,000 |

TABLE 2

DEFINITIONS OF UPSTREAM AND DOWNSTREAM

| Modulation (Document) | Upstream | Downstream |
|---|---|---|
| G.992.1 | xTU-R to xTU-C | xTU-C to xTU-R |
| T1.413 Cat 1 w/ Analog filters | ATU-R to ATU-C | ATU-C to ATU-R |
| G.992.2 | xTU-R to xTU-C | xTU-C to xTU-R |
| DMT with only 64 tones | xTU-R to xTU-C | xTU-C to xTU-R |
| G.hds1 | NTU to LTU | LTU to NTU |
| HDSL2 | NTU to LTU | LTU to NTU |
| VDSL (with European ISDN) DTS/TM-06003-1 (draft) V0.0.7 (1998-2) | NT to ONU (LT) | ONU (LT) to NT-R |

Notes:
xTU-R, NTU, NT indicate customer side
xTU-C, LTU, ONU indicate network side

TABLE 3

Activation signals of existing xDSLs

| Modulation (ITU Document Ref. No.) | Initiator | Responder | Comment |
|---|---|---|---|
| G.992.1 | None - will use handshake procedure | | |
| G.992.2 | None - will use handshake procedure | | |
| T1.413 Issue 1 | R-ACT-REQ | C-ACT1 | |
| | 34.5 kHz sinusoid with cadence of: | 207 kHz (#48) | |
| | 128 symbols on | C-ACT2 | |
| | 64 symbol @ −2 dBm (~16 ms) | 190 kHz (#44) | |
| | 64 symbol @ −22 dBm (~16 ms) | C-ACT3 | |
| | 896 symbols off (~221 ms) | 224 kHz (#52) | |
| | | C-ACT4 | |
| | | 259 kHz (#60) | |

TABLE 3-continued

Activation signals of existing xDSLs

| Modulation (ITU Document Ref. No.) | Initiator | Responder | Comment |
|---|---|---|---|
| T1.413 Issue 2 | (same as Issue 1) | (same as issue 1) | |
| ETSI: ADSL over ISDN | same as T1.413 but k = 42; 181.125 kHz | C-ACT2m 319 kHz (#74) C-ACT2e 328 kHz (#76) | |
| RADSL CAP | RTU-R transmits RSO + trailer (pseudo noise at symbol rate) Using 68 kHz and 85 kHz | Using 282 kHz and 306 kHz | |
| G.hdsl (2B1Q) | LTU transmits S0 | NTU transmits S0 | |
| G.hdsl (CAP - Annex B) | LTU transmits CS0 3150 symbols of pseudo noise at symbol rate | NTU transmits RS0; 3150 symbols of pseudo noise at symbol rate | |
| HDSL2 | TBD | | |
| VDSL DTS/TM-06003-1 (draft) | | | Not defined yet |

With respect to the bands used by ADSL modems, the present invention uses the following detailed criteria to select appropriate carriers for the upstream negotiation channel and the downstream negotiation channel:
1. Consider all of the services/families known today (e.g., G.992.1/G.992.2 Annex a, Annex B, Annex C, HDSL2);
2. Upstream and downstream negotiations will not use the same frequencies (i.e.; the preferred embodiment does not use echo canceling);
3. FDM filter implementations (with a few non-essential additions)—e.g., avoid upstream/downstream interleaving;
4. Avoid existing T1.413 activation tones (e.g., tone numbers 8, 44, 48, 52, 60);
5. G.992.1 Annex a and G.992.2 Annex a use the same upstream and downstream carriers. G.992.1 Annex C and G.992.2 Annex C use the same upstream and downstream carriers;
6. At least one carrier associated with G.992.1 Annex a is the same as the carrier used with G.992.1 Annex C. At least one carrier of G.992.2 Annex a is the same as the carrier used with G.992.2 Annex C. (For both upstream and downstream);
7. The ADSL Annex a downstream band is reduced to tones 37 through 68, based on G.992.2;
8. Be reasonably robust against Intermodulation products;
9. a grid for decimation (mainly applicable for Annex a and Annex B). This allow a sample clock that is lower than the Nyquist rate to still extract the required information, because the folded over signals in the spectrum fall directly on top of each other. Since the tones for Annex C have special requirements, they often cannot be aligned on the same grid as the Annex a and Annex B tones;
10. Higher frequency tones should be spaced farther apart to reduce leakage in the filters;
11. In general, there are 3 tones per Annex (however, Annex C has 2 primary tones each way, and a third borderline tone);
12. Tones between 14 and 64 should not be transmitted in a TCM-ISDN environment; and
13. Avoid (if possible) RADSL activation frequencies. Thus, in the upstream carrier, avoid 68 kHz (~#16) and 85 kHz (~#20). In the downstream carrier, avoid 282 kHz (~#65) and 306 kHz (~#71).

Based on the above discussion, a preferred Embodiment #1 uses the following carriers:

| Family/Direction | Tone Index | Comment |
|---|---|---|
| 4.3 k Upstream | 9, 11, 13, 21, 33, 37, 41 | (Annex a and B tones use the grid 4 N + 1) |
| 4.3 k Downstream | 6, 7, (26), 50, 58, 66, 74, 90, 114 | (Annex a and B tones use the grid 8 N + 2) |
| 4 k family | Reserve Tone area 2–5 | |

A preferred Embodiment #2 uses the following carriers:

| Family/Direction | Tone Index | Comment |
|---|---|---|
| 4.3 k Upstream | 9, 11, 15, 23, 35, 39 - | (Annex a and B tones use the grid 4 N − 1) |
| 4.3 k Downstream | 6, 7, (26), 50, 58, 66, 74, 90, 114 | (Annex a and B tones use the grid 8 N + 2) |
| 4 k family | Reserve Tone area 2–5 | |

A preferred Embodiment #3 uses the following carriers:

| Family/Direction | Tone Index | Comment |
|---|---|---|
| 4.3 k Upstream | 9, 12, 21, 27, 33, 36, 39 | (All tones use the grid 3 N) |
| 4.3 k Downstream | 6, 7, (26), 50, 58, 66, 74, 90, 114 | (Annex a and B tones use the grid 8 N + 2) |
| 4 k family | Reserve Tone area 2–5 | |

A preferred Embodiment #4 uses the following carriers:

| Family/Direction | Tone Index | Comment |
|---|---|---|
| 4.3 k Upstream | 7, 9, 17, 25, 37, 45, 53 | (Annex a and B tones use the grid 4 N + 1) |
| 4.3 k Downstream | 12, 14, 40, 56, 64, 72, 88, 96 | (Annex a and B tones use the grid 8 N) |
| 4 k Upstream | 3 | |
| 4 k Downstream | 5 | |

TABLE 4

CARRIER PREFERRED EMBODIMENT #1

|  | Up | Down | Upstream | | | | Downstream | | | |
|---|---|---|---|---|---|---|---|---|---|---|
| Up- Avoids HDSL2(2-3) | | | 8 | 16, 20 | | | | 65 | 71 | |
| Anx. a | | | | 9 | 13 | 21 | | | | |
| Anx. B | | | | | | 33 37 41 | | | | |
| Anx. C | | | | 9 11 13 | | | | | | |
| Dn- Avoids HDSL2 | | (4-5) | | | | | 44 48 52 60 | | Note 7 | |
| Anx. a | | | | | *2 6 | | 50 58 | 66 | | |
| Anx. B | | | | | Note 6 | | | | 74 90 114 | |
| Anx. C | | 6 7 | | | | | | 66 | 74 | |
| Index | 2,3 4,5 | 6 7 | 8 9 11 13 16, 20 | 21 26 31 33 37 41 | 44 48 50 52 58 60 63 65 66 68 71 74 90 114 255 | | | | | |

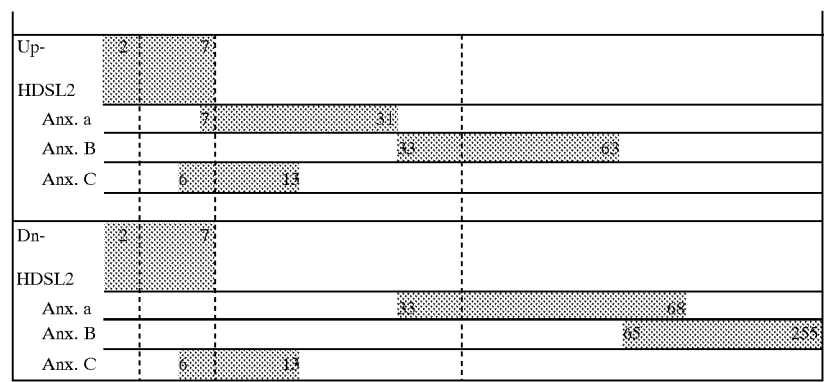

Comments on the selected carriers:
1. The upstream and downstream carriers are completely separated;
2. The upstream and downstream bands of the existing T1.413 activation tones are preserved;
3. Annex B allows the optional use of tones below number 33, in which the ATU-x may be able to use some but not all of the carriers originally designated for Annex a;
4. Annex B upstream band and Annex a downstream band essentially overlap, so the common band was divided between the two requirements;
5. The tones associated with Annex a and B are set along a common grid;
6. * Tone 26 may optionally be used for downstream transmission, so that a much lower frequency could be used in situations in which high frequency line attenuation exists. However, since it is in the midst of the upstream band, certain filter implementations may preclude it's usage;
7. Tone 74 falls in the null of TCM-ISDN spectrum, so there is some positive SNR there and it is in common with Annex B;
8. Tone 74 was selected as the frequency for Annex B's C-ACT2m; and
9. The band to allocate Annex B upstream tones is very narrow. Using 3 carriers places the two outer carriers very near the band edge. If 2 carriers are sufficient, they could have much better placement. In that case, the appropriate upstream grid is 4N−1 and all of the revised upstream carrier values are shown in Table 5.

TABLE 5

UPSTREAM CARRIER PREFERRED EMBODIMENT #2

| | | Down | | | | Upstream | | | | | | | | | | Downstream | | | | | | | | |
|---|---|---|---|---|---|---|---|---|---|---|---|---|---|---|---|---|---|---|---|---|---|---|---|---|
| UP | Avoids HDSL2 | | 8 | | | 16 | 20 | | | | | | | | | | | | | | | | | | |
| | Anx. a | | | | 11 | 15 | | 23 | | | | | | | | | | | | | | | | | |
| | Anx. B | | | | | | | | | | 35 | 39 | | | | | | | | | | | | | |
| | Anx. C | | | 9 | 11 | | | | | | | | | | | | | | | | | | | | |
| Index | | 6 | 7 | 8 | 9 | 11 | 15 | 16 | 20 | 23 | 26 | 31 | 35 | 39 | 44 | 48 | 50 | 52 | 58 | 60 | 63 | 66 | 68 | 74 | 90 | 114 | 255 |

TABLE 6

UPSTREAM CARRIER PREFERRED EMBODIMENT #3

| | | Down | | | | Upstream | | | | | | | | | | Downstream | | | | | | | | |
|---|---|---|---|---|---|---|---|---|---|---|---|---|---|---|---|---|---|---|---|---|---|---|---|---|
| UP | Avoids HDSL2 | | 8 | | | 16 | 20 | | | | | | | | | | | | | | | | | | |
| | Anx. a | | | 9 | 12 | | | 21 | 27 | | | | | | | | | | | | | | | | |
| | Anx. B | | | | | | | | | 33 | 36 | 39 | | | | | | | | | | | | | |
| | Anx. C | | | 9 | 12 | | | | | | | | | | | | | | | | | | | | |
| Index | | 6 | 7 | 8 | 9 | 12 | 15 | 16 | 20 | 21 | 27 | 33 | 36 | 39 | 44 | 48 | 50 | 52 | 58 | 60 | 63 | 66 | 68 | 74 | 90 | 114 | 255 |

TABLE 7

CARRIER PREFERRED EMBODIMENT #4

| | 3 | 5 | 7 | 8 | 9 | 12 | 14 | 17 | 25 | 31 | 34 | 37 | 40 | 44 | 45 | 48 | 52 | 53 | 56 | 60 | 63 | 64 | 65 | 68 | 72 | 88 | 96 | 255 |
|---|---|---|---|---|---|---|---|---|---|---|---|---|---|---|---|---|---|---|---|---|---|---|---|---|---|---|---|---|
| UP Avoids | | | | 8 | | | | | | | | | | | | | | | | | | | | | | | | |
| shdsl | 3 | | | | | | | | | | | | | | | | | | | | | | | | | | | |
| Anx. a | | | | | 9 | | | 17 | 25 | | | | | | | | | | | | | | | | | | | |
| Anx. B | | | | | | | | | | | | 37 | | | 45 | | | 53 | | | | | | | | | | |
| Anx. C | | | 7 | | 9 | | | | | | | | | | | | | | | | | | | | | | | |
| DN Avoids | | | | | | | | | | | | | | 44 | | 48 | 52 | | | 60 | | | | | | | | |
| shdsl | | 5 | | | | | | | | | | | | | | | | | | | | | | | | | | |
| Anx. a | | | | | | | | | | | | | 40 | | | | | | 56 | | | 64 | | | | | | |
| Anx. B | | | | | | | | | | | | | | | | | | | | | | | | | 72 | 88 | 96 | |
| Anx. C | | | | | | 12 | 14 | | | | | | | | | | | | | | | 64 | | | | | | |
| Index | 3 | 5 | 7 | 8 | 9 | 12 | 14 | 17 | 25 | 31 | 34 | 37 | 40 | 44 | 45 | 48 | 52 | 53 | 56 | 60 | 63 | 64 | 65 | 68 | 72 | 88 | 96 | 255 |

TABLE 7-continued

CARRIER PREFERRED EMBODIMENT #4

Although Tables 4–7 describe preferred embodiments, it is understood that other sets of frequencies can be used for other environments, while still conforming to the selection criteria described in this invention.

The frequencies of the carriers are derived by multiplying a base family frequency (e.g., 4.3125 kHz, or 4.000 kHz) by the carrier index. To achieve robustness, multiple carrier symbols are used for each data bit. The 4.0 kHz family, designated as family B, achieves a bit rate of 800 bits/s by dividing the 4000 symbols/sec rate by 5. The 4.3125 kHz family, designated as family a, achieves a bit rate of 539.0625 bits/s by dividing the 4312.5 symbols/sec rate by 8.

In the above carrier selection embodiments for the ADSL bands, several xDSL requirements were simultaneously examined. It is also prudent to be aware of the spectrum used by VDSL modems. However, as of the time of this invention, VDSL transmission techniques have not been finalized. Thus, it is advisable to consider the following criteria and considerations when selecting carriers for use with VDSL devices (modems):

1. Some VDSL splitter designs begin the HPF roll-off at approximately 600 kHz. As a result, some carriers should be above 600 kHz (e.g., ADSL tone #140). Other splitter designs roll-off at approximately 300 kHz (e.g., ADSL tone #70). Thus, carriers above those frequencies would be needed;
2. Although there is discussion of an ADSL-compatible mode of VDSL which ensures no interference to ADSL lines, by significantly reducing power in the carriers below 1.1 MHZ, a VDSL device can transmit carriers in compliance with the ADSL PSDs. Thus, care should be taken not to introduce performance degradation to existing services, and in particular, ADSL service;
3. In this regard, current VDSL proposals call for carriers to be spaced at 21.625 kHz and 43.125 kHz. However, it is likely that devices will initiate in the 43.125 kHz mode, so carriers with a grid of 43.125 kHz is preferred;
4. Carriers should be below 3 MHZ (equivalent to ADSL tone #695), so that they can be detected on the longest of VDSL capable lines;
5. Carriers should avoid known HAM radio bands, such as, for example, 1.8–2.0 MHZ (which is equivalent ADSL tones #417–#464) in North America, or 1.81–2.0 MHZ in Europe;
6. Carriers should be selected so as to avoid interference from AM radio stations;
7. VDSL may employ Time Division Duplex (TDD) techniques. Accordingly, upstream and downstream separations need not be so strict;
8. Signals above 1.1 MHZ in the VDSL band should be transmitted in synchronism with the ONU's chosen superframe structure, in order to avoid Near End Crosstalk (NEXT) into the other TDD VDSL lines in the binder; and
9. At least one set of carriers should be inside the VDSL spectrum plan.

Based on the above, preferred carriers for VDSL, according to the present invention, are as follows:

Downstream Grid=(ADSL downstream grid)×(VDSL grid)= (8N+2)×(10)→100, 180, 260, 340, etc.
Upstream Grid=(ADSL upstream grid)×(VDSL grid)=(4N−1)×(10)→350, 390, 470, 510, 550, etc.

The implicit channel probing feature of the present invention can be used to assess the characteristics of the communication channel while concurrently transmitting information over the communication channel.

Channel probing is performed implicitly by observing all of the initializing carriers sent during the activation sequence, and to verify which carriers were sent, by reading the corresponding bits indicated in Tables 23 and 24. During the reception of unmodulated carriers, the xTU-C, using the negotiation data receiving section 52, and the xTU-R, using the negotiation data receiving section 56, monitor the communication channel (line) to perform a spectrum analysis of the signal to calculate spectrum information. The accuracy of the implicit channel probing need not be precise; it is only necessary to obtain a rough estimate of the SNR in the channel. An xTU-X alters (changes) it's modulation and parameters selections based on the contents of a CL/CLR message exchange and the SNR from the implicit channel probe.

Another problem addressed by the current invention relates to the use of too many carriers, or the use of too much transmission power, during an initialization procedure. In some environments, it is necessary to reduce the number of carriers used to transmit negotiation information in order to be spectrally polite. In such cases, it is difficult to determine which tones the receiver is actually receiving.

According to a first example of the instant invention for reducing the number of carriers, referred to as a Pair Phase Reversal example, upstream and downstream tones are paired. When an xTU-x receives a tone from a particular pair, it transmits phase reversals on it's corresponding mate (pair) before beginning a modulated carrier.

However, this example exhibits the following limitations:
1. One tone of the pair mate might not be usable because of bridge taps or interference; thus, the other pair mate would be idle; and
2. The carriers cannot always be uniquely paired.
a second example of is referred to as a Modulate Carrier Before Messages example. After sending an unmodulated carrier and before sending a modulated carrier, messages begin with flags, the xTU-X modulates all of it's carriers to indicate which carriers it is receiving. Codes can be created by transmitting concatenated 50% duty cycle patterns of 1's and 0's, with different lengths indicating different carriers. The fixed duty cycle allows reception without octet synchronization.

However, this example exhibits the following limitations:
1. The scheme is not bit or time efficient;
2. It would be preferable to octet-synchronize first and then send the information in a digital message;
3. This scheme increases the time required for the activation sequence; and
4. This coding scheme does not include error correction.

a third example is referred to as a Carriers Used and Request Transmit scheme. Based upon the limitations of this scheme (discussed below), example three is the preferred scheme. Carriers to be used in a subsequent session are negotiated via octets in message transactions.

During an initial state, every applicable carrier transmits CL/CLR messages, a list of transmitted carriers is indicated in Table 23 and Table 24. Parameters in the CL/CLR messages used to determine (negotiate) which carriers to use for subsequent messages are shown in Table 34 and Table 35. The number of transmitted carriers may be reduced in the same transaction, such as, but not limited to, MR, MS, ACK, NAK messages in the same transaction. The number of transmitted carriers may also be reduced in subsequent sessions and transactions that initialize with MS or MR messages. As with MS for MS message contents and states, the xTU-X uses some memory to save the usable carrier information.

If a channel impediment, such, as but not limited to, an interferer or a bridge tap arises later, an initialization timeout from the initiating xTU-X allows all of the possible tones to be used from the initiating xTU-X.

In their initial states, the xTU-R and xTU-C are encouraged to transmit as many carriers as possible, in order to determine whether any common carriers exist, a pair of xTU-R and xTU-C negotiate using predetermined procedures, defined above, to specify the transmission of a reduced number of carriers for subsequent messages and subsequent initializations.

If an xTU-X has been instructed to reduce the number of carriers in the midst of completing a transaction, the xTU-X only reduces the carriers when it is in the process of transmitting flags. After the transmission of a complete flag, the xTU-X transmits an unmodulated carrier on the redundant carriers for a period of two octet times before stopping transmission on the redundant carriers.

If an xTU-R and xTU-C have negotiated to use a reduced set of initialization carriers by the procedures defined above, the reduced set of carriers shall be used for a subsequent initialization. If an anticipated response is not received within time $T_1$, prior instructions from the other xTU-X to reduce the number of carriers are ignored and the initialization scheme re-commences.

Either the central office (xTU-C) system 2 or the remote (xTU-R) system 4 may initiate modulation channels. The negotiation data transmitting section 50 of the remote system 4 transmits the upstream negotiation data to the negotiation data receiving section 52 of the central system 2. The negotiating data transmitting section 54 of the central system 2 transmits the downstream negotiating data to the negotiation data receiving section 56 of the remote system 4. After the negotiation modulation channels have been established, the remote station is always considered the initiating modem in terms of the transaction messages. Likewise, the central office terminal is thereafter referred to as the responding station.

a discussion of the initiation by the xTU-R will now be described, followed by a discussion of the initiation by the xTU-C.

The initiating xTU-R transmits unmodulated carriers selected from either one or both families of the Upstream group, via negotiation data transmitting section 50. When the negotiation data receiving section 52 receives the carriers from the xTU-R for a predetermined period of time (at least 200 ms in the preferred embodiment), the responding xTU-C transmits unmodulated carriers, via negotiating data transmitting section 54, selected from only one family of the Downstream group. After receiving the carriers using negotiation data receiving section 56 from the xTU-C for the predetermined period of time (e.g., at least 200 ms), the xTU-R DPSK modulates, using negotiation data transmitting section 50, only one of the family of carriers and transmits a predetermined flag (e.g., $7E_{16}$) as data. If the xTU-R initiated with carriers selected from both families, the xTU-R stops transmitting carriers from the other family before it begins modulating carriers from the selected family. After receiving the flag, via negotiation data receiving section 52 from the xTU-R, the xTU-C DPSK modulates only one of the family of carriers (using negotiating data transmitting section 54) and transmits flag (e.g., $7E_{16}$) as data.

To facilitate the finding of a common set of carriers (if they exist), if an xTU-C receives carriers of a family that it cannot transmit, it nevertheless responds by transmitting carriers from a family it is capable of transmitting. This allows the xTU-R to detect the presence of the xTU-C, and, if it has the capability to do so, attempt an initiating procedure with a different carrier family.

In the disclosed embodiment, the xTU-C and the xTU-R monitor the line for existing services prior to transmitting carriers, to avoid interfering with existing services, using the negotiation data receiving sections 52 and 56, respectively.

The xTU-C transmits identical data, with identical timing on any and all downstream carriers. The xTU-R transmits identical data with identical timing on any and all upstream carriers.

The initiating xTU-C transmits unmodulated carriers selected from either one or both families of the Downstream group using the negotiation data transmitting section 54. After receiving the carriers, using negotiation data receiving section 56, from the xTU-C for (in the preferred embodiment) at least 200 ms, the responding xTU-R transmits unmodulated carriers using the negotiation data transmitting section 50, selected from only one family of the Upstream group. After the carriers are received for at least 200 ms by the negotiation data receiving section 52 of the xTU-R, the xTU-C begins DPSK modulating only one of the family of carriers using the negotiating data transmitting section 54, and transmits ones ($FF_{16}$) as data. If the xTU-C is initiated with carriers selected from both families, the xTU-C stops transmitting carriers from the other family before it begins modulating carriers from the selected family. After receiving ones from the xTU-C, the xTU-R DPSK modulates only one of the family of carriers and transmits flags ($7E_{16}$) as data. After the flags are received from the xTU-R, the xTU-C DPSK modulates only one of the family of carriers and transmits flags ($7E_{16}$) as data.

In order to facilitate the finding a common set of carriers (if they exist), if the xTU-R receives carriers of a family that it cannot transmit, it nevertheless responds by transmitting carriers from a family it is capable of transmitting. This allows the xTU-C to detect the presence of the xTU-R and attempt an initiation with a different carrier family, if it has the capability to do so.

According to the instant invention, the xTU-C and the xTU-R monitor the communication line (using the negotiation data receiving sections 52 and 56, respectively), for existing services prior to transmitting carriers, in order to avoid interfering with existing services.

The xTU-C transmits identical data with identical timing on any and all downstream carriers. The xTU-R transmits identical data with identical timing on any and all upstream carriers.

In the present invention, an error recovery mechanism comprises (but is not limited to) the transmission of an unmodulated carrier of ones ($FF_{16}$), or flags ($7E_{16}$) that shall not exceed, for example, a time period of 1 second. An xTU-x may restart the initiation procedure or may optionally start alternative initiation procedures.

If only one communication device in the communication link implements the present invention's preferred activation method, a high speed communication may not be possible. The following describes mechanisms to fallback (or escape) to legacy communication systems, such as, but no limited to, legacy DSL systems or voiceband communication systems. Fallback to xDSL systems will be described first, followed by a description of the voiceband fallback procedures:

1. Fallback Methods to Legacy xDSL Modulations

Some legacy xDSL systems (examples of which are shown in Table 3) do not implement the present invention. The present invention includes procedures to fallback to a legacy xDSL activation method. The present invention is intended to be a robust mechanism for activating a multiplicity of xDSL modulations in the presence of unknown equipment with unknown transceiver PSDs. The activation of regional standards (i.e., legacy devices) can be handled by two different methods: an implicit method (e.g., activation via escape), or an explicit method (e.g., activation via nonstandard facilities or standard information). Both methods are used to cover the multitude of initialization methods.

The activation via escape method facilitates the startup of devices prior to the present invention beginning the negotiation modulation. This allows the startup of devices which, for example, implement Annex a, B, or C of a predetermined communication standard (with differing PSDs) and a legacy xDSL system, such as, but not limited to T1.413. The present invention monitors several different frequency bands using xTU-C's data receiving section 52 or xTU-R's data receiving section 56. Thus, a device that also supports a regional standard (such as, for example, T1.413) can concurrently (or nearly concurrently) monitor for the regional standard activation signals while monitoring for the activation signals of the present invention, a procedure for interworking with the ANSI T1.413 protocol is shown in Table 8.

The activation via non-standard facilities or standard information embodiment allows the interworking of devices after the initialization of the handshake modulation, by indicating the legacy communication system in a message. The message may use either a non-standard information (NS) field or a Standard Information (S) field.

The present invention allows the transmission and reception of a non-standard message that indicates a different modulation. Regional standards can be explicitly negotiated through non-standard facilities.

The present invention also provides for the transmission and reception of a standard information message that indicate a different modulation. Regional standards can be explicitly negotiated through a code point in the standard information field.

It is understood that other DSL communication systems, such as, but not limited to, for example, RADSL, can be negotiated using the same explicit and implicit methods discussed above for T1.413, without departing from the spirit and/or scope of this invention.

2. Fallback Methods to Voiceband Modulations

Fallback methods for voiceband modulations are similar to the fallback methods described above for xDSL modulations; that is, both explicit and implicit methods exist.

The initial signals for a voiceband modulation are specified in ITU-T Recommendation V.8 and ITU-T Recommendation V.8bis. In the explicit method, after the V.8 or V.8bis code points are selected in an MS message, acknowledged with an ACK(1) message, and the present invention has executed (been completed), the V.8 or V.8bis procedures begins. The xTU-R takes on the roll of a V.8 calling station and the xTU-C takes on the roll of a V.8 answering station.

In the implicit method, if an xTU-X initiates a handshake session by transmitting negotiating tones but does not receive a response from a possible xTU-X at the other end of the communication channel 5, the initiating xTU-X may assume that the other xTU-X does not support a high speed communication, and may then switch to initiating a communication using voiceband procedures such as V.8 and V.8bis.

The instant invention also addresses the prior art problem of having long or complicated initialization transactions when either communication device in the communication link needs to transmit data.

In general, the xTU-C is usually always ON, or will have been turned ON before the xTU-R is turned ON. The xTU-R can always remain ON, but it is more likely that there will be periods in which the xTU-R is turned OFF or placed into a "sleep" mode (a mode in which the xTU-R is placed in a standby mode to minimize electrical power consumption). If the xTU-R is in the sleep mode, the central side needs to "wake up" the xTU-R before a data transmission can occur. Four basic transactions for accomplishing this are described in Table 9.

TABLE 8

ESCAPE ACTIVATION WITH T1.413 DEVICES

| Device: | Capabilities | Algorithm |
| --- | --- | --- |
| ATU-C | T1.413 | Waits for R-ACT-REQ, |
|  |  | Ignores present invention activation signals |
|  |  | Initiates T1.413 when receives R-ACT-REQ |
| ATU-C | T1.413 & present invention | Waits for R-ACT-REQ or present invention initiating tone(s) |
|  |  | Initiates as appropriate |
| ATU-R | T1.413 | Transmits R-ACT-REQ and waits for C-TONE or C-ACT |
|  |  | Ignores any present invention activation signals from the ATU-C |
| ATU-R | T1.413 & present invention | Transmits present invention activation signals. |
|  |  | If no response to present invention activation signals, transmits R-ACT-REQ |

TABLE 9

Four Basic Transaction Needs

| Name | Description | Characteristics |
| --- | --- | --- |
| Remote First Time | very first time initialization of a dedicated circuit typical initialization by a mobile unit | ATU-R initiates modulation full capabilities exchange |
| Remote Reestablish | reestablish a previously negotiated operating mode | ATU-R initiates modulation reconfirmation of previous mode through minimal exchange |
| Central Push (First Time) | The network side wishes the ATU-R to activate in order for the network to deliver a "push" service. | ATU-C initiates modulation full capabilities exchange |
| Central Push Reestablish | Push application desires to reestablish. | ATU-C initiates modulation typically occurs after a previous full capabilities exchange minimal exchange |

Since the xTU-R will always send the first message of a transaction, and the first message should be as meaningful as possible when the xTU-R initializes the modulation, the present invention uses a preferred initialization protocol scheme shown in Table 10. Alternatively, an initialization protocol scheme illustrated in Table 11 may be used. However, it is understood to these transactions may be made without departing from the spirit and/or scope of the instant invention.

Although there are names and scenarios associated with the transaction, the names should merely be considered as informational in nature.

All messages in a transaction are required.

The RC message contains only one bit of information. Setting the bit to "1" represents that the xTU-C was "surprised" by the push request, or is in a state of confusion. In

TABLE 10

Transactions Preferred Scheme #1

| | | Transaction sequence | | | | |
| --- | --- | --- | --- | --- | --- | --- |
| # | Name | xTU-R→ | xTU-C→ | xTU-R→ | xTU-C→ | xTU-R→ |
| Z | First Time | CLR | CL | MS | ACK/NAK | |
| Y | Reestablish | MS | ACK/NAK | | | |
| W | Central Push First Time | RC | CLR | CL | MS | ACK/NAK |
| X | Central Push Reestablish | RC | MS | ACK/NAK | | |

Where:
CL  Transmit a Capabilities List
    This message conveys a list of possible modes of operation of the transmitting station.
CLR Transmit a Capabilities List and Request the other unit to also transmit a capabilities list
    This message conveys a list of possible modes of operation of the transmitting station and
    also requests the transmission of a capabilities list by the remote station.
MS  Mode Select - specify the intended mode.
    This message requests the initiation of a particular mode of operation in the remote station.
ACK Acknowledge the selected mode.
    ACK(1): This message acknowledges receipt of an MS message and terminates a
    transaction. It may also be used to acknowledge receipt of part of a CL-MS message
    combination and request transmission of the remainder of the message combination.
    ACK(2): This message acknowledges receipt of a CL, CLR or MS message and requests the
    transmission of additional information by the remote station, providing the remote station
    has indicated that additional information is available.
NAK Not Acknowledge the selected mode
    This message indicates that the receiving station is unable to interpret a received message or
    to invoke the mode requested by the transmitting station. Four NAK messages are defined:
    NAK(1) (a.k.a. NAK-EF) indicates that the receiving station is unable to interpret the
    received message because it is an Errored Frame;
    NAK(2) (a.k.a NAK-NR) indicates that the receiving station is temporarily unable to invoke
    the mode requested by the transmitting station;
    NAK(3) (a.k.a. NAK-NS) indicates that the receiving station either does not support or has
    disabled the mode requested by the transmitting station; and
    NAK(4) (a.k.a. NAK-NU) indicates that the receiving station is unable to interpret a
    received message.
RC  (a.k.a REQ) Revert control of the transaction to the xTU-C
    The message tells the xTU-C to take control.
MR  This message requests the transmission of a mode select message by the remote station.

this situation, it is recommended (but not mandated) that the xTU-C use transaction X instead of W.

MS always includes the desired mode.

If a xTU-R NAKs in a transaction X but wishes to keep trying, it shall send NAK(_) and then transaction Z.

On the other hand, if an xTU-C NAKs, the xTU-R should send RC to start transaction X or W.

The following is noted in the situations where the xTU-C has initiated the modulation:

1. If the xTU-R is prepared for the xTU-C to dominate, transaction X or W should be utilized. This should be the typical case when the ATU-C initiates the modulation;

2. However, if the xTU-R is to have equal control, it should use transaction Z;

3. Although transaction Y could be used, it is overly presumptuous on the part of the xTU-R; and 4. The initiation of modulation by the xTU-C can also be used in conjunction with a power management system.

TABLE 11

Transactions Preferred Scheme #2

| Transaction number | xTU-R | xTU-C | xTU-R |
|---|---|---|---|
| a (same as Y) | MS→ | ACK/NAK | |
| B (same as X) | MR→ | MS→ | ACK/NAK |
| C (modification of Z and W) | CLR→ | CL→ | ACK/NAK |

All permitted transactions will now be described.

Transactions involving the use of messages CL and CLR permit a transfer or exchange of capabilities between the two stations. Transactions involving the use of message MS allow a specific mode to be requested by either station and permit the other station to accept or decline the transition to the requested mode. Transaction a or B are used to select an operating mode without first establishing their common capabilities. Transaction C is used to exchange information about each station's capabilities. Transaction B is intended to allow the responding station to take control of the outcome of the transaction.

Figure 4:
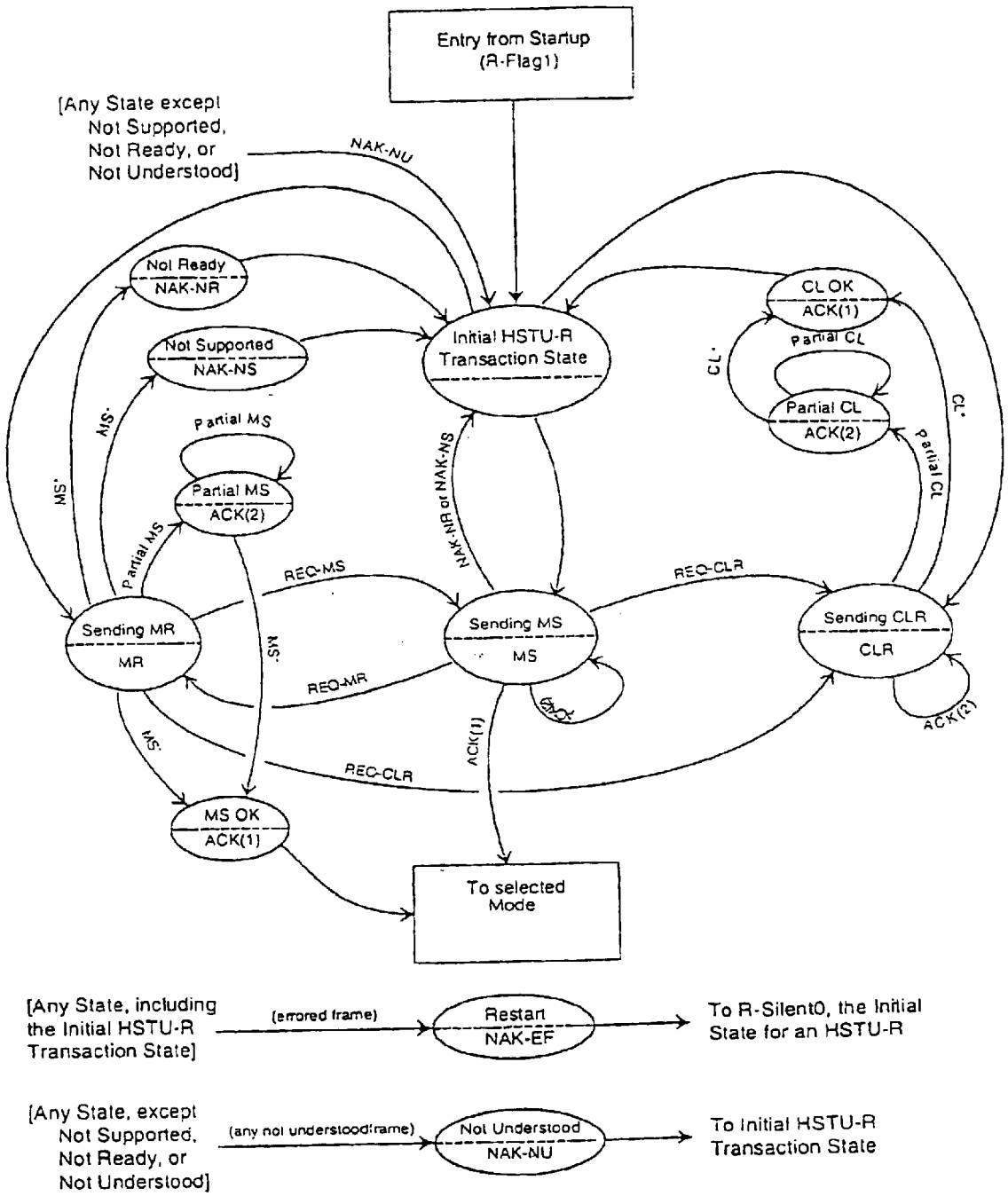
FIG. 4 is a state transition diagram for a transaction message sequence of an xTU-R unit.
Figure 5:
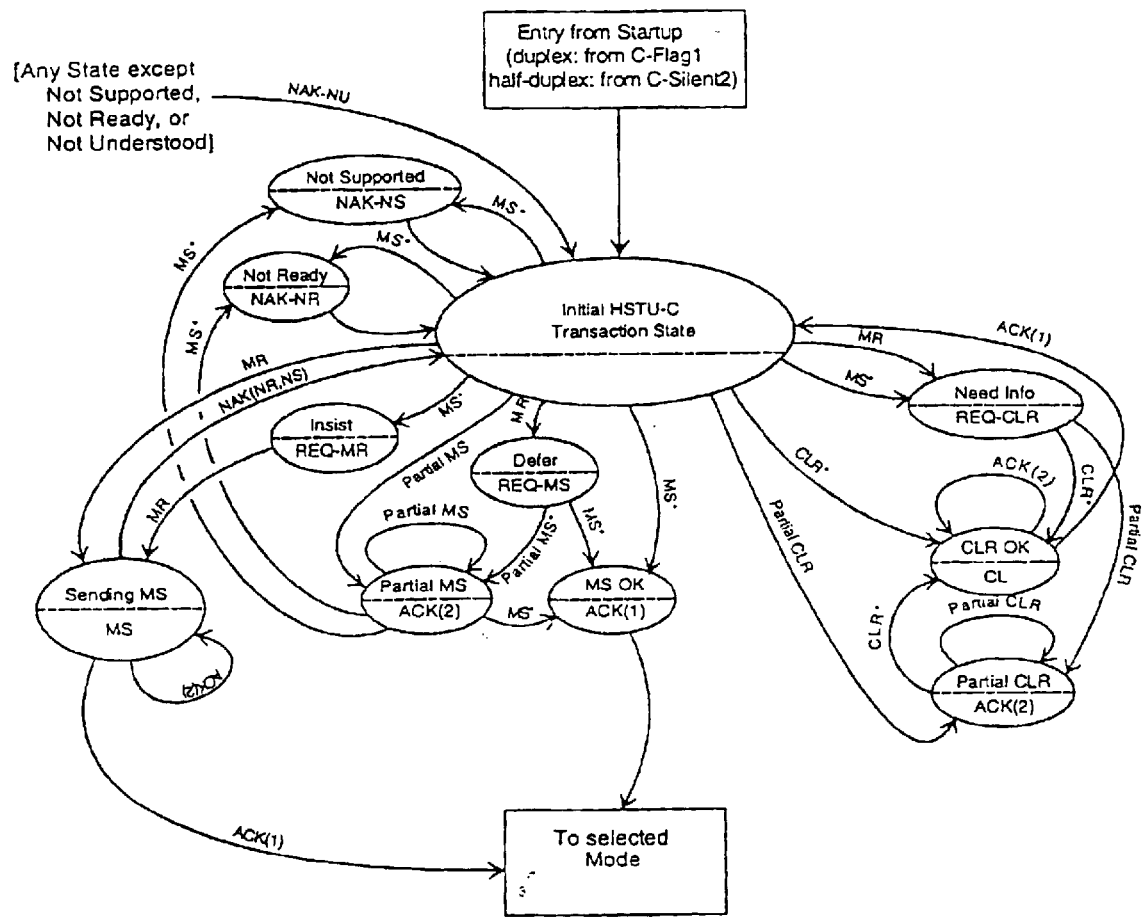
FIG. 5 is a state transition diagram for a transaction message sequence of an xTU-C unit.
Figure 5:
Figure 5:
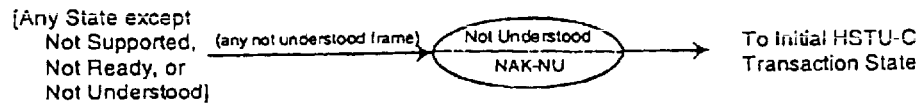

FIGS. 4 and 5 illustrate state transition diagrams for a second transaction embodiment. The state transition diagrams show state information (e.g., the state name and current transmitted message) and transition information (e.g., the received message that caused the state change). In FIGS. 4 and 5, message names followed by an asterisk (*) indicate that the state transition may be taken upon the reception of a complete message, or upon the reception of one or more segments of the message.

When a message is received with the "additional information available" parameter set to binary ONE in the identification field, the receiving station may send an ACK (2) message to request that further information be sent. When the ACK(2) message is received, further information is sent. The transmission of signals associated with a selected mode begins immediately after the transmission of ACK(1).

When a station receives an MS message requesting a mode that it is unable to invoke, the station responds by sending a NAK. If an invalid frame is received in any state, the receiving station sends a NAK(1) and immediately returns to an Initial State. If an xTU-X has transmitted a message, but is not receiving flags or valid message data from the other xTU-X, the error recovery procedures (described above) apply. If an xTU-X has transmitted a message and is receiving flags, it waits for a predetermined period of time, for example, 1 second, before re-transmitting the same message. If the xTU-X has transmitted the same message a certain number of times (e.g., 3 times) without receiving a valid message response from the other xTU-x, the transmitting xTU-X transmits a Hangup message and stops transmitting the carrier. If desired, the xTU-x may restart the initiation attempt or start alternative initiation procedures.

The maximum number of octets in any Information Field is 64. If the information exceeds this limit, the remainder of the information may be contained in subsequent messages. To indicate that further information exists, an "Additional Information Available" parameter is set to binary ONE in the identification field of the transmitted message. This information, however, shall only be sent if, on receiving the message, the remote station sends an ACK(2) message requesting further information.

Where non-standard information is present in the information field, the standard and non-standard information may be conveyed in separate messages. If the information to be conveyed in the CL message cannot be conveyed in a single message, and the "Additional Information Available" parameter is set to binary ONE, a response is required from the receiving station in order for the transmitting station to complete transmission of the combined CL-MS messages, irrespective of whether the additional information is to be sent. In this case, an ACK(1) shall be sent if no further information is required.

The current invention also addresses the desirability of transmitting information in additional to the equipment capabilities (e.g, channel information, service parameters, regulatory information, etc.) during the negotiation procedure. In this regard, the present invention contains several different and additional types of information, as compared to V.8bis and V.8. The types of information emphasize service requirements instead of "application groups". It is noted that the types of information are merely examples of the types and methodology of parameter exchange, and thus, modifications (variations) may be made without departing from the spirit and/or scope of the invention.

The preferred embodiment of the present invention has the general organizational structure shown in Table 12. Modulation independent information is presented in an "Identification" field, and modulation dependent information is presented in a "Standard Information" field. In general, service parameters and channel capabilities information are independent of the various xDSL modulations. The overall composition of messages according to a first example is shown in Table 13, while Table 14 illustrates a second example.

TABLE 12

Information Organization Structure

Identification (Service Parameters/Channel Capabilities) NPar(1) (No sub-parameters)
Identification (Service Parameters/Channel Capabilities) SPar(1) (sub-parameters)
Message Type and version
Vendor Identification using T.35 codes
Amount/type of bandwidth
number of data channels desired
known splitter information
spectrum usable frequencies - generalization of FDM and overlapped spectrum
carrier families, groups, and tone numbers being transmitted
Standard Information (Modulations/protocols) NPar(1)
Standard Information (Modulations/protocols) SPar(1)
Which type of xDSL etc.
Regional considerations (i.e., use of a specific Annex in a Recommendation)
Protocol information error correction, data compression etc.
Non-standard Information

TABLE 13

Overall Message Composition (Embodiment #1)

| | Identification | | | Standard | |
| --- | --- | --- | --- | --- | --- |
| Messages | Message Type & Version (1 octet) | Country Code Provider Length Provider Code (1 + 1 + L octets) | Service & Channel parameters (? octets) | Information Modulations & Protocols available (? octets) | Non Standard Information (3 + M + L octets) |
| RC | Y | Y | — | — | — |
| CLR | Y | Y | Y | Y | as necessary |
| CL | Y | Y | Y | Y | as necessary |
| MS | Y | Y | Y | Y | as necessary |
| ACK | Y | Y | — | — | — |
| NACK | Y | Y | * | * | — |

Notes:
* NACK includes the reason for the NACK by setting the bits of the offending parameters.

TABLE 14

Overall Message Composition (Embodiment #2)

| | Identification | | Standard Information | | Non Standard Information |
| --- | --- | --- | --- | --- | --- |
| Messages | Message Type & Revision (2 octets) | Vendor ID (8 octets) | Service & Channel parameters | Modulations & Protocols available | $1 + \sum_{i=1}^{N} (7 + M_i)$ octets |
| MR | X | — | — | — | — |
| CLR | X | X | X | X | as necessary |
| CL | X | X | X | X | as necessary |
| MS | X | — | X | X | as necessary |
| ACK | X | — | — | — | — |
| NAK | X | — | — | — | — |
| REQ | X | — | — | — | — |

The following describes the organizational details within each category.

Parameters specific to a given xDSL modulation should always appear under the appropriate modulations category. Of those modulation parameters, some of them might be more general than others, and can have higher positions in the NPars/SPars tree.

Parameters that are negotiated in T1.413 are also negotiated in the present invention (with the exception of Vendor ID, which uses T.35 codes). However, there are a few cases when related parameters need to be negotiated by the present invention:

If the optionality of the parameters in G.992.1 differ from T1.413;

If the parameter actually needs to be negotiated instead of just indicated; or

If a general preference about a class of parameters needs to be indicated.

If the parameter is very general, it should be negotiated in the Service Parameters octets on the Identification field. If the parameter is fairly closely related to the modulation, it should be negotiated in the $2^{nd}$ level of the modulation's standard information octets. Even if these modulation parameters are fairly similar among various modulations, they are coded separately for each modulation. Also, other xDSL modulations, such as, for example, VDSL, have some very different parameters, making it very difficult to have one large list of parameters trying to satisfy all of the xDSL requirements and capabilities. As a result, there is some redundancy in the modulation parameters, in much the same way that redundancy exists with V.8bis. Further, many of the parameters under the various applications are identical.

Three types of parameters/options exist; manufacturing, provisioning and negotiated options.

1. Manufacturing Options

Manufacturing options are defined as optional portions of a specification that a manufacturer includes/chooses in the product design. An example of a manufacturing option is to employ EC vs. FDM. Manufacturing options must be disclosed and acknowledged in the startup, since a communication would be impossible without commonality between the various devices.

2. Provisioning Options

Provisioning options are defined as optional capabilities that are in some way fixed a priori. An example of a provisioning option is the Loop timing at the CO that is required to be mastered by either the CO or the CP. The CO capability is normally fixed by a priori decision prior to the negotiation. It is noted that this option can be merged into either the manufacturing or negotiated options. As a result, only a few options are in this category.

3. Negotiated Options

Negotiated options are defined as an option in which an item must be selected from a list of (mandatory available) options. An example of a negotiated option is the data transmission rate. In negotiated options, the transmission rate is made peer to peer.

The information coding format for the present invention will now be described with respect to Tables 15–45. The discussion provided with respect to Tables 15–18 are provided as background information. Tables 20–45 are directed to the features of the instant invention.

Figure 6:
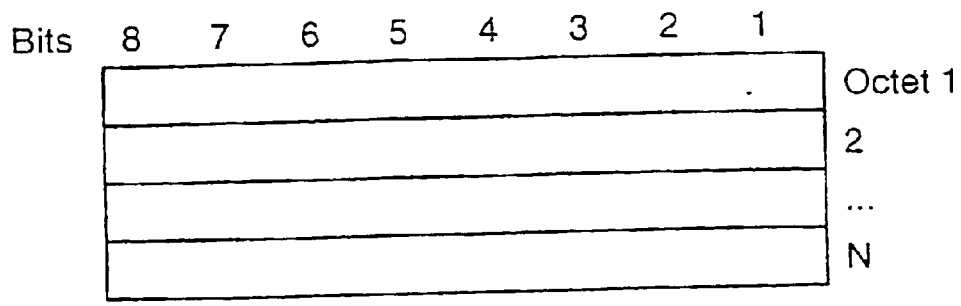
FIG. 6 is a labeling and order format convention for octets in a message.

The basic format convention used for messages is illustrated in FIG. 6. Bits are grouped into octets. The bits of each octet are shown horizontally and are numbered from 1 to 8. Octets are displayed vertically, and are numbered from 1 to N. The octets are transmitted in ascending numerical order. Within an octet, bit 1 is the first bit to be transmitted.

Figure 7:
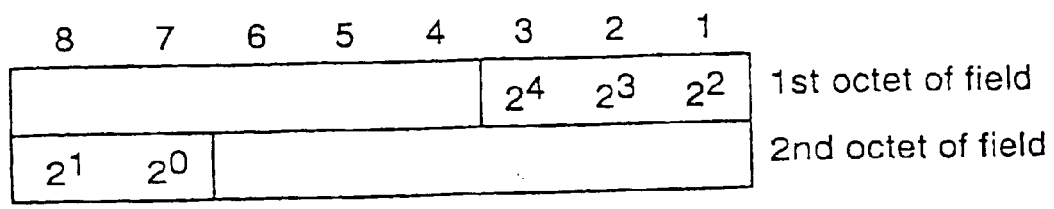
FIG. 7 is a field mapping convention for data that does not reside in a single octet.

For fields which are contained within a single octet, the lowest numbered bit of the field represents the least significant bit ($2^0$). When a field spans multiple octets, the lowest numbered bit of the field in the highest numbered octet containing the field represents the least significant bit ($2^0$). The order of the bit values within each octet increases as the bit number increases. The order of the bit values from octet to octet increases as the octet number decreases. FIG. 7 illustrates a field which spans two octets.

Figure 8:
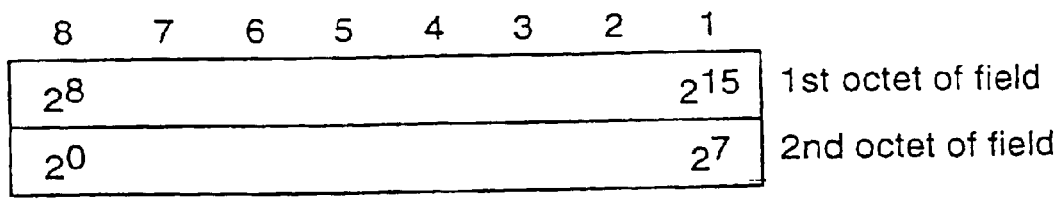
FIG. 8 is a bit order for two octets of a Frame Check Sequence (FCS)

An exception to this convention is the Frame Check Sequence (FCS) field, which spans two octets. In this case, the order of the bit values within the octets is reversed. That is, bit 1 of the first octet is the MSB and bit 8 of the second octet is the LSB (see FIG. 8).

Figure 9:
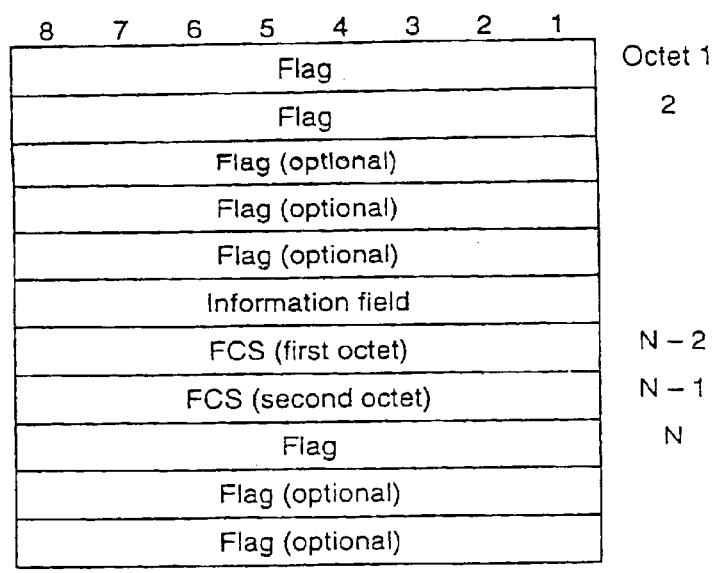
FIG. 9 is the structure of octets in a Frame.

Messages of the instant invention use the frame structure shown in FIG. 9. Messages start and end with a standard HDLC flag octet ($01111110_2$), as defined in ISO/IEC 3309. The Frame Check Sequence (FCS) field is defined in ISO/IEC 3309. Transparency using the Octet stuffing method is defined in ISO/IEC 3309.

Figure 10:
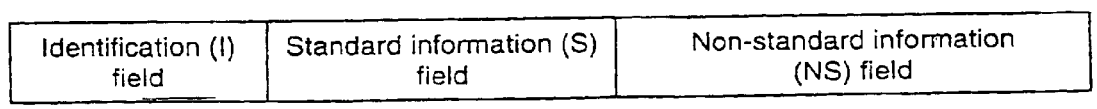
FIG. 10 shows three types of fields of information.

The message information field consists of three components; an identification field (I), followed by a standard information field (S); and an optional non-standard information field (NS). The general structure of the message information field is shown in FIG. 10.

In both the identification (I) and the standard information (S) fields, most of the information to be conveyed consists of parameters relating to particular modes, features or capabilities associated with the two stations. In order to encode these parameters in accordance with a consistent set of rules; and allow future extension of the parameter list in a way that permits present and future implementations of the present invention to correctly parse the information field, the parameters are linked together in an extensible tree structure. The order in which the parameters in the tree are transmitted and the use of delimiting bits which enable the tree to be reconstructed at the receiver will be described in the rules set out below.

Figure 11:
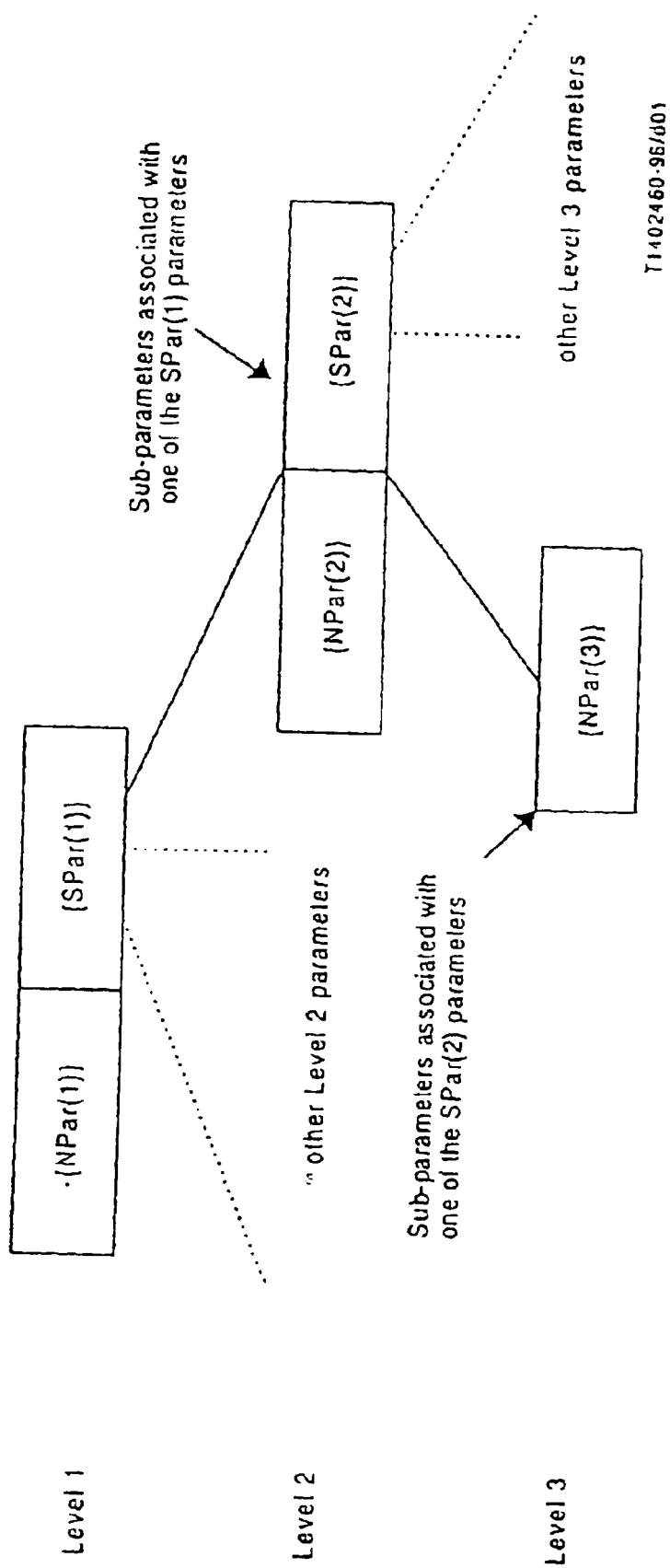
FIG. 11 is a tree structure that links various parameters (NPars and SPars) in an Identification (I) field and a Standard Information (S) field.

Parameters (Pars) are classified as (1) NPars—meaning, parameters which have no subparameters associated with them, and (2) SPars—meaning parameters which have subparameters associated with them. The general structure of this tree is as shown in FIG. 11. At level 1, which is the highest level of the tree, each SPar has a series of Pars (NPars and possibly SPars) at level 2 in the tree associated with it. Similarly, at level 2 in the tree, each SPar has associated with it a series of NPars at level 3 in the tree.

Parameters are binary encoded, and transmitted serially. Parameters of the same type (i.e., level, classification and association) are transmitted sequentially, as a block of data consisting of an integral number of octets. The transmission order of NPars and SPars is specified in FIG. 12. $\{Par(2)_n\}$ indicates a set of level 2 parameters associated with the n'th level 1 SPar, and consists of $NPar(2)_n$ parameters and possibly $SPar(2)_n$ parameters. $\{NPar(3)_{n,m}\}$ indicates a set of level 3 NPars associated with the m'th level 2 SPar, which in turn is associated with the n'th level 1 SPar. The transmission of parameters begins with the first octet of $NPar(1)$ and ends with the last octet of $Par(2)_N$.

Figure 12:
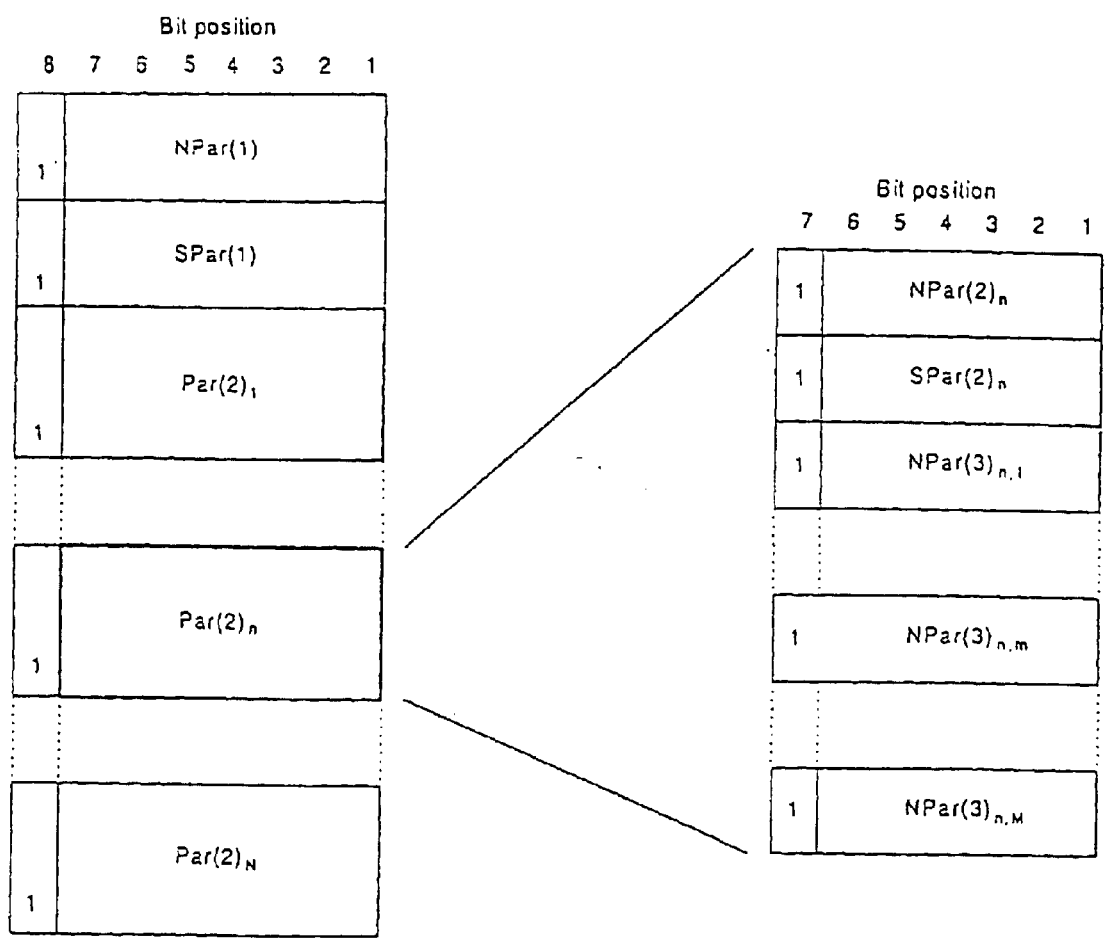
FIG. 12 shows a transmission order of NPars and SPars in a message.

The use of delimiting bits is illustrated in FIG. 12. At least one bit is defined as a delimiting bit within each octet of an information block. This is used to define the last octet in the block. A binary ZERO in this bit position indicates that there is at least one additional octet in the block. A binary ONE in this bit position indicates the last octet in the block.

Bit 8 is used to delimit the $\{NPar(1)\}$ block, the $\{SPar(1)\}$ block, and each of the Par(2) blocks. There are "N" Par(2) blocks, one for each of the capabilities in the $\{SPar(1)\}$ block that is enabled (e.g., set to binary ONE).

Bit 7 is used to delimit each $\{NPar(2)\}$ block, each $\{SPar(2)\}$ block, and each of the associated $\{NPar(3)\}$ blocks. FIG. 12 indicates that there are "M" NPar(3) blocks, one for each of the capabilities in the $\{SPar(2)_n\}$ block that is enabled (e.g., set to binary ONE). "M" may be different for each of the Par(2) blocks.

A Par(2) block may either contain both NPar(2) and SPar(2) octets, or NPar(2) octets alone. To indicate that a Par(2) block contains only NPar(2) octets, bits 7 and 8 are both set to binary ONE in the last NPar(2) octet. Bits 1 through 7 at level 1 of the tree and bits 1 through 6 at level 2 of the tree may be used to encode parameters. To allow for compatibility with future revisions (developments), receivers shall parse all information blocks and ignore information that is not understood.

In a first embodiment, the identification field consists of three components; a four-bit message type field (see Table 15), followed by a four-bit revision number field (see Table 17), followed by a bit-encoded parameter field.

In a second embodiment, the identification field consists of three components; an eight-bit message type field (see Table 16), followed by an eight-bit revision number field (Table 18), followed by a bit-encoded parameter field. This general structure is shown in FIG. 13.

The message type field identifies the message type of the frame. The revision number field identifies the revision number of the current invention to which the equipment conforms. The Identification field encompasses information including, but not limited to: (1) non-modulation specific information, (2) channel capability information, (3) data rate information, (4) data flow characteristics, and (5) splitter Information. The Identification field comprises several octets of NPar(1)s, SPar(1)s, and NPar(2). NPar(1) and SPar(1) octets are always transmitted. NPar(2) octets are transmitted only if the corresponding bit in the SPar(1) is a "1". Octets are transmitted in the order shown in Table 19.

Vendor identification, including, for example, the country code, provider length, and provider code fields, follows the format of ITU-T Recommendation T.35 and is the same as used in the Non-standard field shown in FIG. 15.

TABLE 15

Message type field format Embodiment #1

| Message type | Bit numbers | | | |
|---|---|---|---|---|
| | 4 | 3 | 2 | 1 |
| MS | 0 | 0 | 0 | 1 |
| CL | 0 | 0 | 1 | 0 |
| CLR | 0 | 0 | 1 | 1 |
| ACK(1) | 0 | 1 | 0 | 0 |
| ACK(2) | 0 | 1 | 0 | 1 |
| Reserved for ITU-T | 0 | 1 | 1 | 0 |
| Reserved for ITU-T | 0 | 1 | 1 | 1 |
| NAK(1) | 1 | 0 | 0 | 0 |
| NAK(2) | 1 | 0 | 0 | 1 |
| NAK(3) | 1 | 0 | 1 | 0 |
| NAK(4) | 1 | 0 | 1 | 1 |
| RC | 1 | 1 | 0 | 0 |
| Hangup | 1 | 1 | 0 | 1 |
| Reserved for ITU-T | 1 | 1 | 1 | 0 |
| Reserved for ITU-T | 1 | 1 | 1 | 1 |

TABLE 16

Message type field format Embodiment #2

| Message type | Bit numbers | | | | | | | |
|---|---|---|---|---|---|---|---|---|
| | 8 | 7 | 6 | 5 | 4 | 3 | 2 | 1 |
| MS | 0 | 0 | 0 | 0 | 0 | 0 | 0 | 0 |
| MR | 0 | 0 | 0 | 0 | 0 | 0 | 0 | 1 |
| CL | 0 | 0 | 0 | 0 | 0 | 0 | 1 | 0 |
| CLR | 0 | 0 | 0 | 0 | 0 | 0 | 1 | 1 |
| ACK(1) | 0 | 0 | 0 | 1 | 0 | 0 | 0 | 0 |
| ACK(2) | 0 | 0 | 0 | 1 | 0 | 0 | 0 | 1 |
| NAK-EF | 0 | 0 | 1 | 0 | 0 | 0 | 0 | 0 |
| NAK-NR | 0 | 0 | 1 | 0 | 0 | 0 | 0 | 1 |
| NAK-NS | 0 | 0 | 1 | 0 | 0 | 0 | 1 | 0 |
| NAK-NU | 0 | 0 | 1 | 0 | 0 | 0 | 1 | 1 |
| REQ-MS | 0 | 0 | 1 | 1 | 0 | 1 | 0 | 0 |
| REQ-MR | 0 | 0 | 1 | 1 | 0 | 1 | 0 | 1 |
| REQ-CLR | 0 | 0 | 1 | 1 | 0 | 1 | 1 | 1 |

TABLE 17

Revision Number field format Embodiment #1

| Revision number | Bit numbers | | | |
|---|---|---|---|---|
| | 8 | 7 | 6 | 5 |
| Revision 1 | 0 | 0 | 0 | 1 |

TABLE 18

Revision Number field format Embodiment #2

| Revision number | Bit numbers | | | | | | | |
|---|---|---|---|---|---|---|---|---|
| | 8 | 7 | 6 | 5 | 4 | 3 | 2 | 1 |
| Revision 1 | 0 | 0 | 0 | 0 | 0 | 0 | 0 | 1 |

TABLE 19

Identification Field - Order of Octets

| Name | N/S Type | Table # |
|---|---|---|
| Message type field format | — | Table 15/ Table 16 |
| Version Type field | — | Table 17/ Table 18 |
| Country code | — | |
| Provider Length | — | |
| Provider code (L octets) | — | |
| Identification field - {NPar (1)} coding | NPar(1) | Table 20 |
| Identification field (Capabilities Information) - {SPar(1)} coding - Octet 1 | SPar(1) | Table 21 |
| Identification field (Service Requests) - {SPar(1)} coding - Octet 2 | SPar(1) | Table 22 |
| Identification Field - (CI) Currently transmitted carriers {NPar(2)} coding - Octet 1 | NPar(2) | Table 23 |
| Identification Field - (CI) Currently transmitted carriers {NPar(2)} coding - Octet 2 | NPar(2) | Table 24 |
| Identification field - (CI) Spectrum first usable frequency {NPar(2)} coding | NPar(2) | Table 25 |
| Identification field - (CI) Spectrum maximum frequency - upstream {NPar(2)} coding | NPar(2) | Table 26 |
| Identification field - (CI) Spectrum maximum frequency - downstream {NPar(2)} coding | NPar(2) | Table 27 |
| Identification Field - (CI) Splitter Information {NPar(2)} coding - Octet 1 | NPar(2) | Table 28 |
| Identification Field - (CI) Splitter Information {NPar(2)} coding - Octet 2 | NPar(2) | Table 29 |
| Identification field - (SR) Data rate Amount (Average) {NPar(2)} coding - Octet 1 DS | NPar(2) | Table 30 |

TABLE 19-continued

Identification Field - Order of Octets

| Name | N/S | Type | Table # |
|---|---|---|---|
| Identification field - (SR) Data rate Amount (Maximum) {NPar(2)} coding - Octet 2 | DS | NPar(2) | Table 31 |
| Identification field - (SR) Data rate Amount (Minimum) {NPar(2)} coding - Octet 3 | DS | NPar(2) | Table 32 |
| Identification field - (SR) Data rate Amount (Average) {NPar(2)} coding - Octet 1 | US | NPar(2) | Table 30 |
| Identification field - (SR) Data rate Amount (Maximum) {NPar(2)} coding - Octet 2 | US | NPar(2) | Table 31 |
| Identification field - (SR) Data rate Amount (Minimum) {NPar(2)} coding - Octet 3 | US | NPar(2) | Table 32 |
| Identification field - (SR) Data rate type {NPar(2)} coding | DS | NPar(2) | Table 33 |
| Identification field - (SR) Data rate type {NPar(2)} coding | US | NPar(2) | Table 33 |
| Identification field - (SR) Data rate type {NPar(2)} coding | US | NPar(2) | Table 33 |
| Identification Field - (SR) Request transmission of carriers {NPar(2)} coding - Octet 1 | | NPar(2) | Table 34 |
| Identification Field - (SR) Request transmission of carriers {NPar(2)} coding - Octet 2 | | NPar(2) | Table 35 |

CI = Capabilities Information
SR = Service requirement
DS = Downstream
US = Upstream The Identification (I) parameter field is composed of several octets of NPar(1)s, SPar(1)s, and NPar(2). In the octets, each parameter is assigned a unique bit position (or field), a binary ONE in the assigned bit position indicates that the parameter is valid. The validity of multiple parameters is conveyed by transmitting a binary ONE in each bit position corresponding to a valid parameter, a field is encoded as described in it's table.

NPar(1) and SPar(1) octets are always transmitted. NPar(2) octets are transmitted only if the corresponding bit in the SPar(1) is a "1". Octets are transmitted in the order shown in Table 19. The level 1 NPar is listed in Table 20. The level 1 SPars is described in Table 21 and Table 22 The level 2 NPars are separately described in Table 23 through Table 35.

TABLE 20

Identification field - {NPar(1)} coding

| SPar(1)s | 8 | 7 | 6 | 5 | 4 | 3 | 2 | 1 |
|---|---|---|---|---|---|---|---|---|
| Reserved for ITU-T | x | x | x | x | x | x | x | 1 |
| Rec. V.8 | x | x | x | x | x | x | 1 | x |
| Rec. V.8bis | x | x | x | x | x | 1 | x | x |
| Additional information available | x | x | x | x | 1 | x | x | x |
| Transmit ACK(1) | x | x | x | 1 | x | x | x | x |
| Reserved for ITU-T | x | x | 1 | x | x | x | x | x |
| Non-standard field | x | 1 | x | x | x | x | x | x |
| No parameters in this octet | x | 0 | 0 | 0 | 0 | 0 | 0 | 0 |

NOTE - .
Rec. V.8 and Rec. V.8bis availability can be identified to allow escape into voiceband modulation procedures.

TABLE 21

Identification field (Capabilities Information) - {SPar(1)} coding - Octet 1

| SPar(1)s | 8 | 7 | 6 | 5 | 4 | 3 | 2 | 1 |
|---|---|---|---|---|---|---|---|---|
| Currently transmitted carriers | x | x | x | x | x | x | x | 1 |
| Spectrum first usable frequency | x | x | x | x | x | x | 1 | x |
| Spectrum maximum frequency - upstream | x | x | x | x | x | 1 | x | x |
| Spectrum maximum frequency - downstream | x | x | x | x | 1 | x | x | x |
| Splitter Information - xTU-R | x | x | x | 1 | x | x | x | x |
| Reserved for ITU-T | x | x | 1 | x | x | x | x | x |
| non standard capabilities information | x | 1 | x | x | x | x | x | x |
| No parameters in this octet | x | 0 | 0 | 0 | 0 | 0 | 0 | 0 |

NOTE - .

TABLE 22

Identification field (Service Requests) - {SPar(1)} coding - Octet 2

| SPar(1)s | 8 | 7 | 6 | 5 | 4 | 3 | 2 | 1 |
|---|---|---|---|---|---|---|---|---|
| Data rate Amount Downstream | x | x | x | x | x | x | x | 1 |
| Data rate Amount Upstream | x | x | x | x | x | x | 1 | x |
| Data rate Type Downstream | x | x | x | x | x | 1 | x | x |
| Data rate Type Upstream | x | x | x | x | 1 | x | x | x |
| Request transmit of carriers | x | x | x | 1 | x | x | x | x |
| Reserved for ITU-T | x | x | 1 | x | x | x | x | x |
| non standard service request | x | 1 | x | x | x | x | x | x |
| No parameters in this octet | x | 0 | 0 | 0 | 0 | 0 | 0 | 0 |

Transmitted carriers and families are indicated above.

TABLE 23

Identification Field - (CI) Currently transmitted carriers {NPar(2)} coding - Octet 1

| NPar(2)s | 8 | 7 | 6 | 5 | 4 | 3 | 2 | 1 |
|---|---|---|---|---|---|---|---|---|
| Currently transmitting 4.3125 kHz family (a) | x | x | x | x | x | x | x | 1 |
| Currently transmitting 4 kHz family (B) | x | x | x | x | x | x | 1 | x |
| Currently transmitting carrier $A_{01-X}$ | x | x | x | x | x | 1 | x | x |

TABLE 23-continued

Identification Field - (CI) Currently
transmitted carriers {NPar(2)} coding - Octet 1

| NPar(2)s | 8 | 7 | 6 | 5 | 4 | 3 | 2 | 1 |
|---|---|---|---|---|---|---|---|---|
| Currently transmitting carrier $A_{02-X}$ | x | x | x | x | 1 | x | x | x |
| Currently transmitting carrier $A_{03-X}$ | x | x | x | 1 | x | x | x | x |
| Currently transmitting carrier $A_{04-X}$ | x | x | 1 | x | x | x | x | x |
| No parameters in this octet | x | x | 0 | 0 | 0 | 0 | 0 | 0 |

TABLE 24

Identification Field - (CI) Currently
transmitted carriers {NPar(2)} coding - Octet 2

| NPar(2)s | 8 | 7 | 6 | 5 | 4 | 3 | 2 | 1 |
|---|---|---|---|---|---|---|---|---|
| Currently transmitting carrier $A_{05-X}$ | x | x | x | x | x | x | x | 1 |
| Currently transmitting carrier $A_{06-X}$ | x | x | x | x | x | x | 1 | x |
| Currently transmitting carrier $A_{07-X}$ | x | x | x | x | x | 1 | x | x |
| Currently transmitting carrier $A_{08-X}$ | x | x | x | x | 1 | x | x | x |
| Currently transmitting carrier $B_{01-X}$ | x | x | x | 1 | x | x | x | x |
| Currently transmitting carrier $B_{02-X}$ | x | x | 1 | x | x | x | x | x |
| No parameters in this octet | x | x | 0 | 0 | 0 | 0 | 0 | 0 |

The usable spectrum frequencies of Tables 25-27) are useful to indicate the TX/RX capabilities of the xTU-x (such as, for example, an xTU-C that only transmits through tone 68) and can indicate FDM vs. overlapped spectrum operation availability.

TABLE 25

Identification field - (CI) Spectrum
first usable frequency {NPar(2)} coding

| NPar(2)s | 8 | 7 | 6 | 5 | 4 | 3 | 2 | 1 |
|---|---|---|---|---|---|---|---|---|
| Reserved for ITU-T | x | x | 1 | 1 | 1 | 1 | 1 | 1 |
| Unspecified by terminal | x | x | 0 | 0 | 0 | 0 | 0 | 0 |
| Spectrum first usable frequency (bits 6–1 × 10 KHz) | x | x | x | x | x | x | x | x |

TABLE 26

Identification field - (CI) Spectrum
maximum frequency - upstream {NPar(2)} coding

| NPar(2)s | 8 | 7 | 6 | 5 | 4 | 3 | 2 | 1 |
|---|---|---|---|---|---|---|---|---|
| Reserved for ITU-T | x | x | 1 | 1 | 1 | 1 | 1 | 1 |
| Unspecified by terminal | x | x | 0 | 0 | 0 | 0 | 0 | 0 |
| spectrum maximum frequency - upstream (bits 5–1 × 1 MHZ) | x | x | 1 | x | x | x | x | x |
| spectrum maximum frequency - upstream (bits 5–1 × 10 KHZ) | x | x | 0 | x | x | x | x | x |

TABLE 27

Identification field - (CI) Spectrum
maximum frequency - downstream {NPar(2)} coding

| NPar(2)s | 8 | 7 | 6 | 5 | 4 | 3 | 2 | 1 |
|---|---|---|---|---|---|---|---|---|
| Reserved for ITU-T | x | x | 1 | 1 | 1 | 1 | 1 | 1 |
| Unspecified by terminal | x | x | 0 | 0 | 0 | 0 | 0 | 0 |
| spectrum maximum frequency - downstream (bits 5–1 × 1 MHZ) | x | x | 1 | x | x | x | x | x |
| spectrum maximum frequency - downstream (bits 5–1 × 10 KHZ) | x | x | 0 | x | x | x | x | x |

TABLE 28

Identification Field - (CI) Splitter
Information {NPar(2)} coding - Octet 1

| NPar(2)s | 8 | 7 | 6 | 5 | 4 | 3 | 2 | 1 |
|---|---|---|---|---|---|---|---|---|
| LPF is voice | x | x | x | x | x | x | x | 1 |
| LPF is USA ISDN | x | x | x | x | x | x | 1 | x |
| LPF is European ISDN | x | x | x | x | x | 1 | x | x |
| Reserved for ITU-T | x | x | x | x | 1 | x | x | x |
| Reserved for ITU-T | x | x | x | 1 | x | x | x | x |
| Non-standard LPF | x | x | 1 | x | x | x | x | x |
| No parameters in this octet | x | x | 0 | 0 | 0 | 0 | 0 | 0 |

TABLE 29

Identification Field - (CI) Splitter
Information {NPar(2)} coding - Octet 2

| NPar(2)s | 8 | 7 | 6 | 5 | 4 | 3 | 2 | 1 |
|---|---|---|---|---|---|---|---|---|
| HPF is 25 kHz (voice) | x | x | x | x | x | x | x | 1 |
| HPF is 90 kHz USA ISDN | x | x | x | x | x | x | 1 | x |
| HPF is 150 kHz (ADSL with European ISDN) | x | x | x | x | x | 1 | x | x |
| HPF is 300 kHz (VDSL) | x | x | x | x | 1 | x | x | x |
| Reserved for ITU-T | x | x | x | 1 | x | x | x | x |
| Non-standard HPF | x | x | 1 | x | x | x | x | x |
| No parameters in this octet | x | x | 0 | 0 | 0 | 0 | 0 | 0 |

TABLE 30

Identification field - (SR) Data Rate Amount (Average) {NPar(2)} coding - Octet 1

| NPar(2)s | 8 | 7 | 6 | 5 | 4 | 3 | 2 | 1 |
|---|---|---|---|---|---|---|---|---|
| Reserved for ITU-T | x | x | 1 | 1 | 1 | 1 | 1 | 1 |
| Unspecified by terminal | x | x | 0 | 0 | 0 | 0 | 0 | 0 |
| Average bandwidth (bits 5–1 × 512 kbps) | x | x | 1 | x | x | x | x | x |
| Average bandwidth (bits 5–1 × 32 kbps) | x | x | 0 | x | x | x | x | x |

TABLE 31

Identification field - (SR) Data Rate Amount (Maximum) {NPar(2)} coding - Octet 2

| NPar(2)s | 8 | 7 | 6 | 5 | 4 | 3 | 2 | 1 |
|---|---|---|---|---|---|---|---|---|
| Reserved for ITU-T | x | x | 1 | 1 | 1 | 1 | 1 | 1 |
| Unspecified by terminal | x | x | 0 | 0 | 0 | 0 | 0 | 0 |
| Maximum bandwidth (bits 5–1 × 512 kbps) | x | x | 1 | x | x | x | x | x |
| Maximum bandwidth (bits 5–1 × 32 kbps) | x | x | 0 | x | x | x | x | x |

TABLE 32

Identification field - (SR) Data Rate Amount (Minimum) {NPar(2)} coding - Octet 3

| NPar(2)s | 8 | 7 | 6 | 5 | 4 | 3 | 2 | 1 |
|---|---|---|---|---|---|---|---|---|
| Reserved for ITU-T | x | x | 1 | 1 | 1 | 1 | 1 | 1 |
| Unspecified by terminal | x | x | 0 | 0 | 0 | 0 | 0 | 0 |
| Minimum bandwidth (bits 5–1 × 512 kbps) | x | x | 1 | x | x | x | x | x |
| Minimum bandwidth (bits 5–1 × 32 kbps) | x | x | 0 | x | x | x | x | x |

TABLE 33

Identification field - (SR) Data rate type {NPar(2)} coding

| NPar(2)s | 8 | 7 | 6 | 5 | 4 | 3 | 2 | 1 |
|---|---|---|---|---|---|---|---|---|
| Low latency | x | x | x | x | x | x | x | 1 |
| Constant latency | x | x | x | x | x | x | 1 | x |
| Bursty | x | x | x | x | x | 1 | x | x |
| etc | x | x | x | x | 1 | x | x | x |
|  | x | x | x | 1 | x | x | x | x |
|  | x | x | 1 | x | x | x | x | x |
| No parameters in this octet | x | x | 0 | 0 | 0 | 0 | 0 | 0 |

An xTU-X may request that the other xTU-X transmit only on a certain number of carriers. This permits a reduction in the number of carriers for the rest of the transaction, or for the next initialization, as described above. Note that an xTU-X should only send a request that it knows the other xTU-X can fulfill.

TABLE 34

Identification Field - (SR) Request Transmission of Carriers {NPar(2)} coding - Octet 1

| NPar(2)s | 8 | 7 | 6 | 5 | 4 | 3 | 2 | 1 |
|---|---|---|---|---|---|---|---|---|
| Request transmit using 4.3125 kHz family (A) | x | x | x | x | x | x | x | 1 |
| Request transmit using 4 kHz family (B) | x | x | x | x | x | x | 1 | x |
| Request transmit on carrier $A_{01-X}$ | x | x | x | x | x | 1 | x | x |
| Request transmit on carrier $A_{02-X}$ | x | x | x | x | 1 | x | x | x |
| Request transmit on carrier $A_{03-X}$ | x | x | x | 1 | x | x | x | x |
| Request transmit on carrier $A_{04-X}$ | x | x | 1 | x | x | x | x | x |
| No parameters in this octet | x | x | 0 | 0 | 0 | 0 | 0 | 0 |

TABLE 35

Identification Field - (SR) Request Transmission of Carriers {NPar(2)} coding - Octet 2

| NPar(2)s | 8 | 7 | 6 | 5 | 4 | 3 | 2 | 1 |
|---|---|---|---|---|---|---|---|---|
| Request transmit on carrier $A_{05-X}$ | x | x | x | x | x | x | x | 1 |
| Request transmit on carrier $A_{06-X}$ | x | x | x | x | x | x | 1 | x |
| Request transmit on carrier $A_{07-X}$ | x | x | x | x | x | 1 | x | x |
| Request transmit on carrier $A_{08-X}$ | x | x | x | x | 1 | x | x | x |
| Request transmit on carrier $B_{01-X}$ | x | x | x | 1 | x | x | x | x |
| Request transmit on carrier $B_{02-X}$ | x | x | 1 | x | x | x | x | x |
| No parameters in this octet | x | x | 0 | 0 | 0 | 0 | 0 | 0 |

The Standard Information field is composed of several octets of NPar(1)'s, SPar(1)'s, and possibly NPar(2), SPar(2), and SPar(3). NPar(1) and SPar(1) octets are specified herein and are always transmitted. NPar(1) octet encoding is described in Table 36, while SPar(1) octets encoding is described in Tables 37 and 38.

The contents of NPar(2), SPar(2), and SPar(3) octets are transmitted only if the corresponding bit in SPar(1) is a "1". In general, the contents regard modulation and protocol details specific to respective ITU-T Recommendations. Some illustrative specifications of modulation encoding are given in Tables 39–45.

TABLE 36

Standard Information field - {NPar(1)} coding

| SPar(1)s | 8 | 7 | 6 | 5 | 4 | 3 | 2 | 1 |
|---|---|---|---|---|---|---|---|---|
| Voiceband (Rec. V.8 or V.8bis) | x | x | x | x | x | x | x | 1 |
| G.997.1 (clear EOC) channel using present invention | x | x | x | x | x | x | 1 | x |
| Reserved for ITU-T | x | x | x | x | x | 1 | x | x |
| Reserved for ITU-T | x | x | x | x | 1 | x | x | x |
| Reserved for ITU-T | x | x | x | 1 | x | x | x | x |

TABLE 36-continued

Standard Information field - {NPar(1)} coding

| SPar(1)s | 8 | 7 | 6 | 5 | 4 | 3 | 2 | 1 |
|---|---|---|---|---|---|---|---|---|
| Reserved for ITU-T | x | x | 1 | x | x | x | x | x |
| Reserved for ITU-T | x | 1 | x | x | x | x | x | x |
| No parameters in this octet | x | 0 | 0 | 0 | 0 | 0 | 0 | 0 |

TABLE 37

Standard Information field - {SPar(1)} coding - Octet 1

| SPar(1)s | 8 | 7 | 6 | 5 | 4 | 3 | 2 | 1 |
|---|---|---|---|---|---|---|---|---|
| G.992.1 - Annex A | x | x | x | x | x | x | x | 1 |
| G.992.1 - Annex B | x | x | x | x | x | x | 1 | x |
| G.992.1 - Annex C | x | x | x | x | x | 1 | x | x |
| G.hdsl | x | x | x | x | 1 | x | x | x |
| G.992.2 | x | x | x | 1 | x | x | x | x |
| G.992.2 - (in TCM-ISDN environment) | x | x | 1 | x | x | x | x | x |
| Non-standard capabilities (modulations) | x | 1 | x | x | x | x | x | x |
| No parameters in this octet | x | 0 | 0 | 0 | 0 | 0 | 0 | 0 |

TABLE 38

Standard Information field - {SPar(1)} coding - Octet 2

| SPar(1)s | 8 | 7 | 6 | 5 | 4 | 3 | 2 | 1 |
|---|---|---|---|---|---|---|---|---|
| ANSI HDSL2/G.hdsl2 | x | x | x | x | x | x | x | 1 |
| ANSI VDSL a/G.vdsl Annex a | x | x | x | x | x | x | 1 | x |
| ANSI VDSL B/G.vdsl Annex B | x | x | x | x | x | 1 | x | x |
| ANSI T1.413 Issue 2 | x | x | x | x | 1 | x | x | x |
| Reserved for ITU-T | x | x | x | 1 | x | x | x | x |
| Reserved for ITU-T | x | x | 1 | x | x | x | x | x |
| Reserved for ITU-T | x | 1 | x | x | x | x | x | x |
| No parameters in this octet | x | 0 | 0 | 0 | 0 | 0 | 0 | 0 |

TABLE 39

Modulation - G.992.1 Annex a {NPar(2)} coding - Octet 1

| NPar(2)s | 8 | 7 | 6 | 5 | 4 | 3 | 2 | 1 |
|---|---|---|---|---|---|---|---|---|
| Specify parameters or profiles for G.992.1 Annex a | x | x | x | x | x | x | x | 1 |
|  | x | x | x | x | x | x | 1 | x |
| STM = 0, ATM = 1 | x | x | x | x | x | 1 | x | x |
| NTR | x | x | x | x | 1 | x | x | x |
| etc | x | x | x | 1 | x | x | x | x |
|  | x | x | 1 | x | x | x | x | x |
| No parameters in this octet | x | x | 0 | 0 | 0 | 0 | 0 | 0 |

TABLE 40

Modulation - G.992.1 Annex a {NPar(2)} coding - Octet 2

| NPar(2)s | 8 | 7 | 6 | 5 | 4 | 3 | 2 | 1 |
|---|---|---|---|---|---|---|---|---|
| AS1/ATM1 downstream | x | x | x | x | x | x | x | 1 |
| AS2 downstream | x | x | x | x | x | x | 1 | x |
| AS3 downstream | x | x | x | x | x | 1 | x | x |
| LS1 downstream | x | x | x | x | 1 | x | x | x |
| LS2 downstream | x | x | x | 1 | x | x | x | x |
| LS1/ATM1 upstream | x | x | 1 | x | x | x | x | x |
| No parameters in this octet | x | x | 0 | 0 | 0 | 0 | 0 | 0 |

TABLE 41

Modulation - G.992.1 Annex a {NPar(2)} coding - Octet 3

| NPar(2)s | 8 | 7 | 6 | 5 | 4 | 3 | 2 | 1 |
|---|---|---|---|---|---|---|---|---|
| LS2 upstream | x | x | x | x | x | x | x | 1 |
|  | x | x | x | x | x | x | 1 | x |
|  | x | x | x | x | x | 1 | x | x |
|  | x | x | x | x | 1 | x | x | x |
|  | x | x | x | 1 | x | x | x | x |
|  | x | x | 1 | x | x | x | x | x |
| No parameters in this octet | x | x | 0 | 0 | 0 | 0 | 0 | 0 |

TABLE 42

Modulation - G.992.1 Annex B {NPar(2)} coding - Octet 1

| NPar(2)s | 8 | 7 | 6 | 5 | 4 | 3 | 2 | 1 |
|---|---|---|---|---|---|---|---|---|
| 0 = Tones above 32/1 = Tones below 33 allowed - NOTE | x | x | x | x | x | x | x | 1 |
|  | x | x | x | x | x | x | 1 | x |
|  | x | x | x | x | x | 1 | x | x |
| etc | x | x | x | x | 1 | x | x | x |
|  | x | x | x | 1 | x | x | x | x |
|  | x | x | 1 | x | x | x | x | x |
| No parameters in this octet | x | x | 0 | 0 | 0 | 0 | 0 | 0 |

NOTE -
When the message is sent by the ATU-C, it indicates it ability to receive tones (0 = RX Tones above 32/1 = RX Tones below 33 allowed). When sent by the ATU-C, it indicates the ability to transmit tones. (0 = only TX Tones above 32/1 = RX Tones 33 to 63 mandatory, RX tones 1 to 32 optional)

TABLE 43

Modulation - G.992.1 Annex C {NPar(2)} coding - Octet 1

| NPar(2)s | 8 | 7 | 6 | 5 | 4 | 3 | 2 | 1 |
|---|---|---|---|---|---|---|---|---|
| Specify parameters or profiles for G.992.1 Annex C | x | x | x | x | x | x | x | 1 |
|  | x | x | x | x | x | x | 1 | x |
|  | x | x | x | x | x | 1 | x | x |
| etc | x | x | x | x | 1 | x | x | x |
|  | x | x | x | 1 | x | x | x | x |
|  | x | x | 1 | x | x | x | x | x |
| No parameters in this octet | x | x | 0 | 0 | 0 | 0 | 0 | 0 |

TABLE 44

Modulation - G.hdsl {NPar(2)} coding

| NPar(2)s | 8 | 7 | 6 | 5 | 4 | 3 | 2 | 1 |
|---|---|---|---|---|---|---|---|---|
| Use G.hdsl Annex B | x | x | x | x | x | x | x | 1 |
|  | x | x | x | x | x | x | 1 | x |
|  | x | x | x | x | x | 1 | x | x |
| etc | x | x | x | x | 1 | x | x | x |
|  | x | x | x | 1 | x | x | x | x |
|  | x | x | 1 | x | x | x | x | x |
| No paramerers in this octet | x | x | 0 | 0 | 0 | 0 | 0 | 0 |

TABLE 45

Modulation - G.992.2 {NPar(2)} coding - Octet 1

| NPar(2)s | 8 | 7 | 6 | 5 | 4 | 3 | 2 | 1 |
|---|---|---|---|---|---|---|---|---|
| Specify parameters or profiles for G.992.2 | x | x | x | x | x | x | x | 1 |
|  | x | x | x | x | x | x | 1 | x |
|  | x | x | x | x | x | 1 | x | x |
| etc | x | x | x | x | 1 | x | x | x |
|  | x | x | x | 1 | x | x | x | x |
|  | x | x | 1 | x | x | x | x | x |
| No parameters in this octet | x | x | 0 | 0 | 0 | 0 | 0 | 0 |

The MS, CL, and CLR messages may optionally contain a non-standard information field to convey information beyond that defined herein. When non-standard information is to be sent, the "Non-standard field" parameter is set to binary ONE in the identification field of the transmitted message. The non-standard information field may optionally be composed of one or more non-standard information blocks (see FIG. 14).

Each non-standard information block (see FIG. 15) comprises: (1) a length indicator (one octet) that specifies the length of the remainder of the block; (2) a country code (K octets), as defined in Recommendation T.35; (3) a length indicator (one octet), that specifies the length of the provider code(e.g., the value in octets indicating that L octets follow); (4) a provider code as specified by the country identified in Recommendation T.35; and (5) non-standard information (M octets).

The present invention permits the modulation used by the present invention to continue to be transmitted after the negotiation procedures are complete. According to a feature of the present inventions the modulation can be used as, for example, a clear channel EOC. For example, a standard information NPar(1) bit indicates the availability of CL/CLR messages, and the same bit is used to indicate selection in MS messages. Following the termination of the present invention negotiation protocol with the ACK message, the carrier could remain ON to provide a clear EOC channel.

In the past, the configuration of an ATU-R Handshake by a Terminal was performed using either AT commands, or other proprietary means. According to the instant invention, an AOM management protocol is used between a Terminal and the ATU-R, and a similar communication path between the ATU-C and the network management systems. In the preferred embodiments, the Terminal uses the SNMP protocol (IETF RFC 1157 published May 1990) to configure and monitor the present invention's handshake procedure in an ATU-R. Since the present invention's handshake procedure data rate is under 100 bytes/sec, a reasonable time needs to be provided for the Terminal to actively participate in the handshake session.

In general, the CL and CLR message parameters can be set before the handshake procedure begins. The present invention enables the Terminal to inquire (of the ATU-R) the status of several of the parameters.

SNMP Traps can be used to indicate critical parts of the received messages that must be acted on by the Terminal if it desires to influence items, such as, for example, MS or ACK/NAK messages.

While the invention has been particularly shown and described with reference to the preferred embodiments thereof, it is understood by those skilled in the art that various alterations in form and/or detail may may be made without departing from the spirit and/or scope of the invention, as defined by the following claims. Although the invention has been described with reference to the particular means, materials and embodiments, it is to be understood that the invention is not limited to the particulars disclosed herein, but extends to all equivalents within the scope of the claims.

What is claimed is:

1. A communication apparatus utilizing a Digital Subscriber Line (xDSL) modem that is selectively connected to a central communication apparatus to perform a full duplex communication, comprising:

a communicator that transmits a plurality of Mode Request (MR) signals to the central communication apparatus, said plurality of MR signals requesting that the central communication apparatus respond by transmitting a plurality of Mode Select (MS) signals to the communication apparatus, said plurality of MS signals designating a particular communication mode;

said communicator transmitting one of acknowledge (ACK) signals and negative acknowledge (NAK) signals to the central communication apparatus when said plurality of MS signals are received by the communication apparatus, wherein first frequencies utilized by said plurality of MR signals and second frequencies utilized by said plurality of MS signals belong to a mutually different band, said plurality of MR signals carrying identical data with an identical timing, but having different carrier frequencies.

2. The communication apparatus of claim 1, wherein said first frequencies are lower than said second frequencies.

3. The communication apparatus of claim 1, wherein said plurality of MR signals comprise three MR signals, and wherein said plurality of MS signals comprise three MS signals.

4. The communication apparatus of claim 3, wherein said first frequencies utilized by said three MR signals comprise 9 times a base carrier frequency, 17 times said base carrier frequency, and 25 times said base carrier frequency, wherein said base carrier frequency comprises one of 4.3125 kHz and 4.000 kHz.

5. The communication apparatus of claim 3, wherein said second frequencies utilized by said three MS signals comprise 40 times a base carrier frequency, 56 times said base carrier frequency, and 64 times said base carrier frequency, wherein said base carrier frequency comprises one of 4.3125 kHz and 4.000 kHz.

6. The communication apparatus of claim 1, wherein said communicator transmits said NAK signals in response to receiving a plurality of MS signals that require a non-executable mode.

7. The communication apparatus of claim 6, wherein said communicator returns the communication apparatus to an initialization state after said NAK signals are transmitted.

8. The communication apparatus of claim 1, wherein each MR signal, of said plurality of MR signals, starts and ends with a High level Data Link Control (HDLC) flag, and includes an identification field and a frame check sequence (FCS) field.

9. The communication apparatus of claim 8, wherein said identification field includes revision information.

10. A central communication apparatus selectively connectable to a remote communication apparatus to perform a full duplex communication utilizing a Digital Subscriber Line (xDSL) modem, the central communication apparatus comprising:

a communicator that transmits a plurality of Mode Select (MS) signals to the remote communication apparatus to designate a particular communication mode in response to a receipt of a plurality of Mode Request (MR) signals from the remote communication apparatus, said plurality of MR signals requesting that the central communication apparatus transmit said plurality of MS signals;

wherein first frequencies utilized by said plurality of MR signals and second frequencies utilized by said plurality of MS signals belong to a mutually different band, said plurality of MS signals carrying identical data with an identical timing, but having different carrier frequencies.

11. The central communication apparatus of claim 10, wherein said first frequencies are lower than said second frequencies.

12. The central communication apparatus of claim 10, wherein said plurality of MS signals comprise three MS signals, and wherein said plurality of MR signals comprise three MR signals.

13. The central communication apparatus of claim 12, wherein said first frequencies comprise 9 times a base carrier frequency, 17 times said base carrier frequency, and 25 times said base carrier frequency, wherein said base carrier frequency comprises one of 4.3125 kHz and 4.000 kHz.

14. The central communication apparatus of claim 12, wherein said second frequencies comprise 40 times a base carrier frequency, 56 times said base carrier frequency; and 64 times said base carrier frequency, wherein said base carrier frequency comprises one of 4.3125 kHz and 4.000 kHz.

15. The central communication apparatus of claim 10, wherein each MS signal, of said plurality of MS signals, includes an identification field that stores modulation independent information, and a standard information field that stores modulation dependent information, data in each field being hierarchically stored.

16. The central communication apparatus of claim 15, wherein each MS signal, of said plurality of MS signals, includes a plurality of octets, a highest bit of each of said plurality of octets delimiting data within said plurality of octets.

17. The central communication apparatus of claim 15, wherein said identification field includes revision information.

18. The central communication apparatus of claim 15, wherein said standard information field includes information designating ITU-T Recommendation G.992.1.

19. The central communication apparatus of claim 15, wherein said standard information field includes information designating ITU-T Recommendation G.992.2.

20. A method for performing a full duplex communication from a remote communication apparatus to a central communication apparatus utilizing a Digital Subscriber Line (xDSL) modem, comprising:

transmitting a plurality of Mode Request (MR) signals to the central communication apparatus that request that the central communication apparatus respond by transmitting a plurality of Mode Select (MS) signals designating a particular communication mode to the remote communication apparatus;

transmitting one of acknowledge (ACK) signals and negative acknowledge (NAK) signals to the central communication apparatus when the plurality of MS signals are received by the remote communication apparatus, wherein first frequencies utilized by the plurality of MR signals and second frequencies utilized by the plurality of MS signals belong to a mutually different band, the plurality of MR signals carrying identical data with an identical timing, but having different carrier frequencies.

21. The method of claim 20, further comprising having the first frequencies be lower than the second frequencies.

22. The method of claim 20, wherein transmitting a plurality of MR signals comprise transmitting three MR signals, and wherein transmitting a plurality of MS signals comprise transmitting three MS signals.

23. The method of claim 22, wherein the first frequencies utilized by the three MR signals comprise 9 times a base carrier frequency, 17 times the base carrier frequency, and 25 times the base carrier frequency, wherein the base carrier frequency comprises one of 4.3125 kHz and 4.000 kHz.

24. The method of claim 22, wherein the second frequencies utilized by the three MS signals comprise 40 times a base carrier frequency, 56 times the base carrier frequency, and 64 times the base carrier frequency, wherein the base carrier frequency comprises one of 4.3125 kHz and 4.000 kHz.

25. The method of claim 22, further comprising transmitting the NAK signals when a plurality of MS signals that require a non-executable mode is received.

26. The method of claim 25, further comprising returning the remote communication apparatus to an initialization state after the NAK signals are transmitted.

27. The method of claim 20, further comprising having each MR signal, of the plurality of MR signals, start and end with a High level Data Link Control (HDLC) flag, and including an identification field and a frame check sequence (FCS) field.

28. The method of claim 27, further comprising associating revision information in the identification field.

29. The method of claim 20, further comprising having each MS signal, of the plurality of MS signals, include a plurality of octets, a highest bit of each of the plurality of octets delimiting data within the plurality of octets.

30. The method of claim 20, further comprising having each MS signal, of the plurality of MS signals, include an identification field that stores modulation independent information, and a standard information field that stores modulation dependent information.

31. The method of claim 30, further comprising associating information designating ITU-T Recommendation G.992.1 with the standard information field.

32. The method of claim 30, further comprising associating information designating ITU-T Recommendation G.992.2 with the standard information field.

33. A method for performing a full duplex communication from a central communication apparatus to a remote communication apparatus utilizing a Digital Subscriber Line (xDSL) modem, comprising:

transmitting a plurality of Mode Select (MS) signals to the remote communication apparatus that designate a particular communication mode after a plurality of Mode Request (M/R) signals from the remote communication apparatus, which request that the central communication apparatus transmit the plurality of MS signals, are received by the central communication apparatus;

wherein first frequencies utilized by the plurality of MR signals and second frequencies utilized by the plurality of MS signals belong to a mutually different band, the plurality of MS signals carrying identical data with an identical timing, but having different carrier frequencies.

34. The method of claim 33, further comprising having the first frequencies be lower than the second frequencies.

35. The method of claim 33, wherein transmitting a plurality of MR signals comprise transmitting three MR signals, and wherein transmitting a plurality of MS signals comprise transmitting three MS signals.

36. The method of claim 35, wherein the first frequencies utilized by the three MR signals comprise 9 times a base carrier frequency, 17 times the base carrier frequency, and 25 times the base carrier frequency, the base carrier frequency comprising one of 4.3125 kHz and 4.000 kHz.

37. The method of claim 35, wherein the second frequencies utilized by the three MS signals comprise 40 times a base carrier frequency, 56 times the base carrier frequency, and 64 times the base carrier frequency, the base carrier frequency comprising one of 4.3125 kHz and 4.000 kHz.

38. The method of claim 33, further comprising having each MR signal, of the plurality of MR signals, start and end with a High level Data Link Control (HDLC) flag, and including an identification field and a frame check sequence (FCS) field.

39. The method of claim 38, further comprising associating revision information in the identification field.

40. The method of claim 33, further comprising having each MS signal, of the plurality of MS signals, include a plurality of octets, a highest bit of each of the plurality of octets delimiting data within the plurality of octets.

41. The method of claim 33, further comprising having each MS signal, of the plurality of MS signals, include an identification field that stores modulation independent information, and a standard information field that stores modulation dependent information.

42. The method of claim 41, further comprising associating information designating ITU-T Recommendation G.992.1 with the standard information field.

43. The method of claim 41, further comprising associating information designating ITU-T Recommendation G.992.2 with the standard information field.

* * * * *

UNITED STATES PATENT AND TRADEMARK OFFICE
CERTIFICATE OF CORRECTION

PATENT NO. : 6,952,442 B2  
APPLICATION NO. : 10/657271  
DATED : October 4, 2005  
INVENTOR(S) : Stephen Palm It is certified that error appears in the above-identified patent and that said Letters Patent is hereby corrected as shown below:

On the cover of the printed patent, at Item (56), References Cited, Foreign Patent Documents, "97149229" (found on page 2 of the cover) should be --97/49229--.

Signed and Sealed this

Twelfth Day of September, 2006

JON W. DUDAS  
*Director of the United States Patent and Trademark Office*